United States Patent
Kim et al.

(10) Patent No.: US 9,232,286 B2
(45) Date of Patent: Jan. 5, 2016

(54) IPTV RECEIVER AND METHOD FOR CONTROLLING AN APPLICATION IN THE IPTV RECEIVER

(75) Inventors: Kyung Ho Kim, Seoul (KR); Jong Yeul Suh, Seoul (KR); Chang Hoon Kim, Seongnam-si (KR); Joon Hui Lee, Seoul (KR); Jin Pil Kim, Seoul (KR); Seok Joo Lee, Seoul (KR); Hyeong Ho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 723 days.

(21) Appl. No.: 12/654,622

(22) Filed: Dec. 24, 2009

(65) Prior Publication Data
US 2010/0175099 A1 Jul. 8, 2010

Related U.S. Application Data

(60) Provisional application No. 61/140,624, filed on Dec. 24, 2008, provisional application No. 61/142,616, filed on Jan. 5, 2009.

(51) Int. Cl.
*H04N 7/025* (2006.01)
*H04N 7/00* (2011.01)
(Continued)

(52) U.S. Cl.
CPC ....... *H04N 21/84* (2013.01); *H04N 21/234318* (2013.01); *H04N 21/45452* (2013.01); *H04N 21/45455* (2013.01); *H04N 21/47205* (2013.01); *H04N 21/4854* (2013.01);
(Continued)

(58) Field of Classification Search
CPC ............... H04N 21/234318; H04N 21/45452; H04N 21/45455; H04N 21/84; H04N 21/47205; H04N 21/4854; H04N 21/6125
USPC .............. 725/35, 38, 51, 110; 386/46; 705/26
See application file for complete search history.

(56) References Cited

U.S. PATENT DOCUMENTS 6,608,633 B1 * 8/2003 Sciammarella et al. ........ 725/46
6,832,388 B1 * 12/2004 Du Val .......................... 725/110
(Continued)

FOREIGN PATENT DOCUMENTS

CN 1972401 5/2007
EP 0 982 947 A2 3/2000
(Continued)

OTHER PUBLICATIONS

Stoll G et al: "GMF4ITV: Neue Wege zur Interaktivitaet mit Bewegten Objek Beim Digitalen Fernsehen", FKT Fernseh und Kinotechnik, Fachverlag Schiele & Schon GMBH., Berlin, DE, vol. 60, No. 4, Jan. 1, 2006, pp. 171-178, XP001502993, ISSN: 1430-9947.

*Primary Examiner* — Randy Flynn
(74) *Attorney, Agent, or Firm* — Dentons US LLP

(57) ABSTRACT

An IPTV and a method for controlling a video widget in the IPTV are disclosed. Herein, a method for providing a video widget application includes playing-back a video content within an IP packet, executing a video widget application, and selecting a specific area of the video content being played-back, and outputting an object guide including an object list included in the selected specific area. The method also includes selecting at least one object from the object guide, selecting a video filter to be applied to the at least one selected object from the video Widget application, and applying the selected video filter to the at least one selected object.

8 Claims, 35 Drawing Sheets

(51) Int. Cl.

| | | |
|---|---|---|
| *H04N 7/173* | (2011.01) | |
| *H04N 5/93* | (2006.01) | |
| *H04N 5/445* | (2011.01) | |
| *G06F 3/00* | (2006.01) | |
| *G06F 13/00* | (2006.01) | |
| *G11B 27/00* | (2006.01) | |
| *H04N 21/84* | (2011.01) | |
| *H04N 21/2343* | (2011.01) | |
| *H04N 21/4545* | (2011.01) | |
| *H04N 21/472* | (2011.01) | |
| *H04N 21/485* | (2011.01) | |
| *H04N 21/61* | (2011.01) | |
| *H04N 5/45* | (2011.01) | |
| *H04N 21/47* | (2011.01) | |

(52) U.S. Cl.
CPC ............ *H04N 21/6125* (2013.01); *H04N 5/45* (2013.01); *H04N 21/47* (2013.01)

(56) References Cited

U.S. PATENT DOCUMENTS

| | | | |
|---|---|---|---|
| 7,747,853 B2* | 6/2010 | Candelore | 725/109 |
| 2003/0028873 A1* | 2/2003 | Lemmons | 725/32 |
| 2003/0037340 A1* | 2/2003 | Devara et al. | 725/110 |
| 2003/0227569 A1 | 12/2003 | Kim | |
| 2004/0183756 A1* | 9/2004 | Freitas et al. | 725/37 |
| 2005/0071864 A1* | 3/2005 | Denoue et al. | 725/14 |
| 2005/0086690 A1* | 4/2005 | Gilfix et al. | 725/42 |
| 2006/0101487 A1* | 5/2006 | Jarman et al. | 725/34 |
| 2006/0130120 A1* | 6/2006 | Brandyberry et al. | 725/136 |
| 2006/0200842 A1* | 9/2006 | Chapman et al. | 725/34 |
| 2007/0006252 A1 | 1/2007 | Yun | |
| 2007/0009099 A1 | 1/2007 | Kikuchi et al. | |
| 2007/0058933 A1 | 3/2007 | Kobayashi et al. | |
| 2007/0124766 A1* | 5/2007 | Relan et al. | 725/38 |
| 2007/0180480 A1* | 8/2007 | Park et al. | 725/88 |
| 2007/0268312 A1* | 11/2007 | Marks et al. | 345/633 |
| 2008/0046953 A1* | 2/2008 | Kossila | 725/132 |
| 2008/0168391 A1 | 7/2008 | Robbin et al. | |
| 2008/0195961 A1 | 8/2008 | Bae et al. | |
| 2008/0201650 A1 | 8/2008 | Lemay et al. | |
| 2008/0232763 A1 | 9/2008 | Brady | |
| 2009/0043842 A1* | 2/2009 | Rhim et al. | 709/203 |
| 2009/0083815 A1* | 3/2009 | McMaster et al. | 725/110 |
| 2009/0172746 A1* | 7/2009 | Aldrey et al. | 725/61 |
| 2009/0276805 A1* | 11/2009 | Andrews, II et al. | 725/35 |
| 2009/0300677 A1* | 12/2009 | Zalewski | 725/38 |

FOREIGN PATENT DOCUMENTS

| | | |
|---|---|---|
| EP | 1376930 A2 | 1/2004 |
| EP | 1 645 944 | 4/2006 |

\* cited by examiner

FIG. 6

```xml
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings"
        minOccurs="0" maxOccurs="unbounded"/>
    <xs:element name="IPEncapsulations" type="ns1:tIPEncapsulations"
        minOccurs="0" maxOccurs="unbounded"/>
    <xs:element name="Extension" type="ns1:tExtension" minOccurs="0"/>
    <xs:any namespace="##other" processContents="lax"
        minOccurs="0" maxOccurs="unbounded"/>
    <xs:element name="GraphicResolution" type="ns1:tGraphicResolution"
        minOccurs="0"/>
    <xs:element name="GraphicColors" type="ns1:tGraphicColors"
        minOccurs="0"/>
    <xs:element name="AvailableResources" type="ns1:tAvailableResources"
        minOccurs="0"/>
    <xs:element name="SupportedFilters" type="ns1:tSupportedFilters"
        minOccurs="0"/>
  </xs:sequence>
</xs:complexType>
<xs:complexType name="tGraphicColors">
  <xs:attribute name="colorDepth"/>
  <xs:simpleType>
    <xs:restriction base="xs:string">
      <xs:enumeration value="32bpp"/>
      <xs:enumeration value="24bpp"/>
      <xs:enumeration value="16bpp"/>
      <xs:enumeration value="8bpp"/>
      <xs:enumeration value=""/>
    </xs:restriction>
  </xs:simpleType>
  </xs:attribute>
</xs:complexType>
<xs:complexType name="tGraphicResolution">
  <xs:attribute name="HorizontalSize" type="xs:integer"/>
  <xs:attribute name="VerticalSize" type="xs:integer"/>
  <xs:attribute name="Rotate" type="xs:boolean"/>
</xs:complexType>
<xs:complexType name="tAvailableResources">
  <xs:sequence>
    <xs:element name="nonVolatileMemory" type="xs:unsignedInt"
        minOccurs="0"/>
    <xs:element name="VolatileMemory" type="xs:unsignedInt"
        minOccurs="0"/>
  </xs:sequence>
</xs:complexType>
<xs:complexType name="tSupportedFilters">
  <xs:sequence>
    <xs:element name="sharpness" type="xs:string" minOccurs="0"/>
    <xs:element name="blur" type="xs:string" minOccurs="0"/>
    <xs:element name="contrast" type="xs:string" minOccurs="0"/>
    <xs:element name="smoothness" type="xs:string" minOccurs="0"/>
    <xs:element name="brightness" type="xs:string" minOccurs="0"/>
    <xs:element name="gamma" type="xs:string" minOccurs="0"/>
    <xs:element name="temperature" type="xs:string" minOccurs="0"/>
  </xs:sequence>
</xs:complexType>
```

FIG. 9A

```
<complexType name="DeviceInfoType">
  <sequence>
    <element name="Manufacturer">
      <simpleType>
        <restriction base="string"><maxLength value="64"/></restriction>
      </simpleType>
    </element>
    <element name="ManufacturerOUI">
      <simpleType>
        <restriction base="string"><maxLength value="6"/></restriction>
      </simpleType>
    </element>
    <element name="ModelName">
      <simpleType>
        <restriction base="string"><maxLength value="64"/></restriction>
      </simpleType>
    </element>
    <element name="Description">
      <simpleType>
        <restriction base="string"><maxLength value="256"/></restriction>
      </simpleType>
    </element>
    <element name="ProductClass">
      <simpleType>
        <restriction base="string"><maxLength value="64"/></restriction>
      </simpleType>
    </element>
    <element name="SerialNumber">
      <simpleType>
        <restriction base="string"><maxLength value="64"/></restriction>
      </simpleType>
    </element>
    <element name="HardwareVersion">
      <simpleType>
        <restriction base="string"><maxLength value="64"/></restriction>
      </simpleType>
    </element>
    <element name="SoftwareVersion">
      <simpleType>
        <restriction base="string"><maxLength value="64"/></restriction>
      </simpleType>
    </element>
    <element name="EnabledOptions">
      <simpleType>
        <restriction base="string"><maxLength value="1024"/></restriction>
      </simpleType>
    </element>
    <element name="AdditionalHardwareVersion">
      <simpleType>
        <restriction base="string"><maxLength value="64"/></restriction>
      </simpleType>
    </element>
```

FIG. 9B

```
<element name="AdditionalSoftwareVersion"/>
  <simpleType>
    <restriction base="string"><maxLength value="64"/></restriction>
  </simpleType>
</element>
<element name="ProvisioningCode"/>
  <simpleType>
    <restriction base="string"><maxLength value="64"/></restriction>
  </simpleType>
</element>
<element name="DeviceStatus">
  <simpleType>
    <restriction base="string">
      <enumeration value="Up"/>
      <enumeration value="Initializing"/>
      <enumeration value="Error"/>
      <enumeration value="Disabled"/>
    </restriction>
  </simpleType>
</element>
<element name="Uptime" type="unsignedInt"/>
<element name="FirstUseDate" type="dateTime"/>
<element name="DeviceLog">
  <simpleType>
    <restriction base="string">
      <maxLength value="32768"/>
    </restriction>
  </simpleType>
</element>
<element name="AvailableResources" type="rc:AvailableResourcesType"/>
</sequence>
</complexType>
<complexType name="AvailableResourcesType">
  <sequence>
    <element name="nonVolatileMemory" type="unsignedInt" minOccurs="0"/>
    <element name="VolatileMemory" type="unsignedInt" minOccurs="0"/>
  </sequence>
</complexType>
```

FIG. 11

```
<complexType name="STBServiceCapablitiesType">
 <sequence>
  <element name="FrontEnd" type="rc:FrontEndType"/>
  <element name="PVR" type="rc:PVRType"/>
  <element name="AudioDecoder" type="rc:AudioDecoderType"/>
  <element name="VideoDecoder" type="rc:VideoDecoderType"/>
  <element name="AudioOutput" type="rc:AudioOutputType"/>
  <element name="VideoOutput" type="rc:VideoOutputType"/>
  <element name="CA" type="rc:CAType"/>
  <element name="DRM" type="rc:DRMType"/>
  <element name="ServiceMonitoring" type="rc:ServiceMonitoringType"/>
  <element name="AudienceStats" type="rc:AudienceStatsType"/>
  <element name="Graphic" type="rc:GraphicType"/>
  <element name="SupportedFilters" type="rc:SupportedFiltersType"/>
 </sequence>
 <attribute name="MaxActiveAVStreams" type="rc:MaximunNumberType"/>
 <attribute name="MaxActiveAVPlayers" type="rc:MaximunNumberType"/>
</complexType>
<annotation>
 <documentation>STBServiceType</documentation>
</annotation>
<complexType name="STBServiceType">
 <sequence>
  <element name="Capabilities" type="rc:STBServiceCapablitiesType"
       maxOccurs="unbounded"/>
 </sequence>
</complexType>
<complexType name="GraphicColorsType">
 <attribute name="colorDepth">
  <simpleType>
   <restriction base="string"/>
  </simpleType>
 </attribute>
</complexType>
<complexType name="GraphicResolutionType">
 <attribute name="HorizontalSize" type="integer"/>
 <attribute name="VerticalSize" type="integer"/>
 <attribute name="Rotate" type="boolean"/>
</complexType>
<complexType name="GraphicType">
 <sequence>
  <element name="GraphicResolution" type="rc:GraphicResolutionType"/>
  <element name="GraphicColor" type="rc:GraphicColorsType"/>
 </sequence>
</complexType>
<complexType name="SupportedFiltersType">
 <sequence>
  <element name="sharpness" type="string" minOccurs="0"/>
  <element name="blur" type="string" minOccurs="0"/>
  <element name="contrast" type="string" minOccurs="0"/>
  <element name="smoothness" type="string" minOccurs="0"/>
  <element name="brightness" type="string" minOccurs="0"/>
  <element name="gamma" type="string" minOccurs="0"/>
  <element name="temperature" type="string" minOccurs="0"/>
 </sequence>
</complexType>
```

FIG. 13

```
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings
                " minOccurs="0" maxOccurs="unbounded"/>
    <xs:element name="IPEncapsulations" type="ns1:tIPEncapsulations
                " minOccurs="0" maxOccurs="unbounded"/>
    <xs:element name="Extension" type="ns1:tExtension" minOccurs="0"/>
    <xs:any namespace="##other" processContents="lax" minOccurs="0" maxOccurs="unbounded"/>
    <xs:element name="GraphicResolution" type="ns1:tGraphicResolution" minOccurs="0"/>
    <xs:element name="GraphicColors" type="ns1:tGraphicColors" minOccurs="0"/>
    <xs:element name="AvailableResources" type="ns1:tAvailableResources" minOccurs="0"/>
    <xs:element name="SupportedFilters" type="ns1:tSupportedFilters" minOccurs="0"/>
    <xs:element name="ApplicationSettings" type="ns1:tApplicationSetting
                " minOccurs="0" maxOccurs="unbounded"/>
  </xs:sequence>
</xs:complexType>
<xs:complexType name="tApplicationSetting">
  <xs:sequence>
    <xs:element name="ApplicationID" type="xs:string" minOccurs="0"/>
    <xs:element name="RevisionNumber" type="xs:string" minOccurs="0"/>
    <xs:element name="Settings" minOccurs="0">
      <xs:complexType>
        <xs:sequence>
          <xs:element name="Position" type="xs:unsignedInt" minOccurs="0"/>
          <xs:element name="Extension" type="ns1:tExtension" minOccurs="0"/>
          <xs:any namespace="##other" processContents="lax" minOccurs="0" maxOccurs="unbounded"/>
        </xs:sequence>
      </xs:complexType>
    </xs:element>
  </xs:sequence>
</xs:complexType>
```

FIG. 21

| Video Object ID | Parameter Set ID | Function Type | Parameters Value |
|---|---|---|---|
| | | | |

FIG. 22

| Macroblock / Block number | Parameter Set ID | Function Type | Parameters Value |
|---|---|---|---|
| | | | |

… # IPTV RECEIVER AND METHOD FOR CONTROLLING AN APPLICATION IN THE IPTV RECEIVER

This application claims the benefit of U.S. Provisional Application No. 61/140,624, filed on Dec. 24, 2008, which is hereby incorporated by reference. Also, this application further claims the benefit of U.S. Provisional Application No. 61/142,616, filed on Jan. 5, 2009, which is hereby incorporated by reference.

BACKGROUND OF THE INVENTION

1. Field of the Invention

The present invention relates to an internet protocol television (IPTV) receiver, and more particularly, to an IPTV receiver and a method for controlling an application for applying video filters in video contents that are being played.

2. Discussion of the Related Art

Related art broadcast receivers received broadcast signals from a broadcasting medium, such as terrestrial, satellite, and cable, thereby providing the broadcast signals to users. Recently, however, IPTV services enabling the reception and transmission of broadcast signals in IP packets via internet protocol (IP) are being actively provided. Unlike other broadcasting media, such IPTV services are free from all geographical limitations. More specifically, once a user is connected to an internet protocol (IP), the user may be provided with the requested IPTV services. However, in the related art broadcast receivers, the settings for video filters that have already been provided were uniformly (or equally) applied for all video contents, which eventually lead to problems of not being able to fully reflect the individuality of each video content, thereby causing inconvenience to the user.

SUMMARY OF THE INVENTION

Accordingly, the present invention is directed to an IPTV receiver and a method for controlling an application in the IPTV receiver that substantially obviates one or more problems due to limitations and disadvantages of the related art.

An object of the present invention is to provide an IPTV receiver and a method for controlling an application in the IPTV receiver that can provide a user with the requested picture quality or screen effect, by enabling the user to select a video filter of the IPTV receiver and applying the selected video filter to the corresponding IPTV receiver. For example, the user may wish for a higher sharpness, when viewing an action movie. In this case, the present invention is advantageous in that a video filter adequately set-up for the received video content may be applied for the user's viewing convenience. The application of identical filter settings for different types of video contents is known to be one of the largest complaints made by the users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing a video Widget application includes playing-back a video content within an IP packet, executing a video widget application, and selecting a specific area of the video content being played-back, and outputting an object guide including an object list included in the selected specific area.

Herein, the method also includes selecting at least one object from the object guide, selecting a video filter to be applied to the at least one selected object from the video widget application, and applying the selected video filter to the at least one selected object.

In another aspect of the present invention, an IPTV receiver includes a receiving unit, a demultiplexer, a decoder, a user input receiver, a controller, and a display unit. More specifically, the receiving unit receives an IP packet. Herein, the IP packet may include a video content and signaling information on the video content. The demultiplexer demultiplexes the received IP packet. The decoder decodes the video content. The user input receiver receives a specific area within the video content and a video filter that is to be applied to the specific area. The controller executes the video Widget application and controls the IPTV, so that the video filter can be applied to the specific area within the video content via the video Widget application. And, the display unit outputs the video content having the video filter applied thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a diagram showing an XML schema of FIG. 5;

FIG. 9A and FIG. 9B illustrate a diagram showing an XML schema of FIG. 8;

FIG. 11 illustrates a diagram showing an XML schema of FIG. 10;

FIG. 13 illustrates a diagram showing an XML schema of FIG. 12;

FIG. 21 and FIG. 22 illustrate exemplary data structures for mapping a video area and a video display parameter that is used for applying a custom filter according to the present invention;

DETAILED DESCRIPTION OF THE INVENTION

Figure 1:
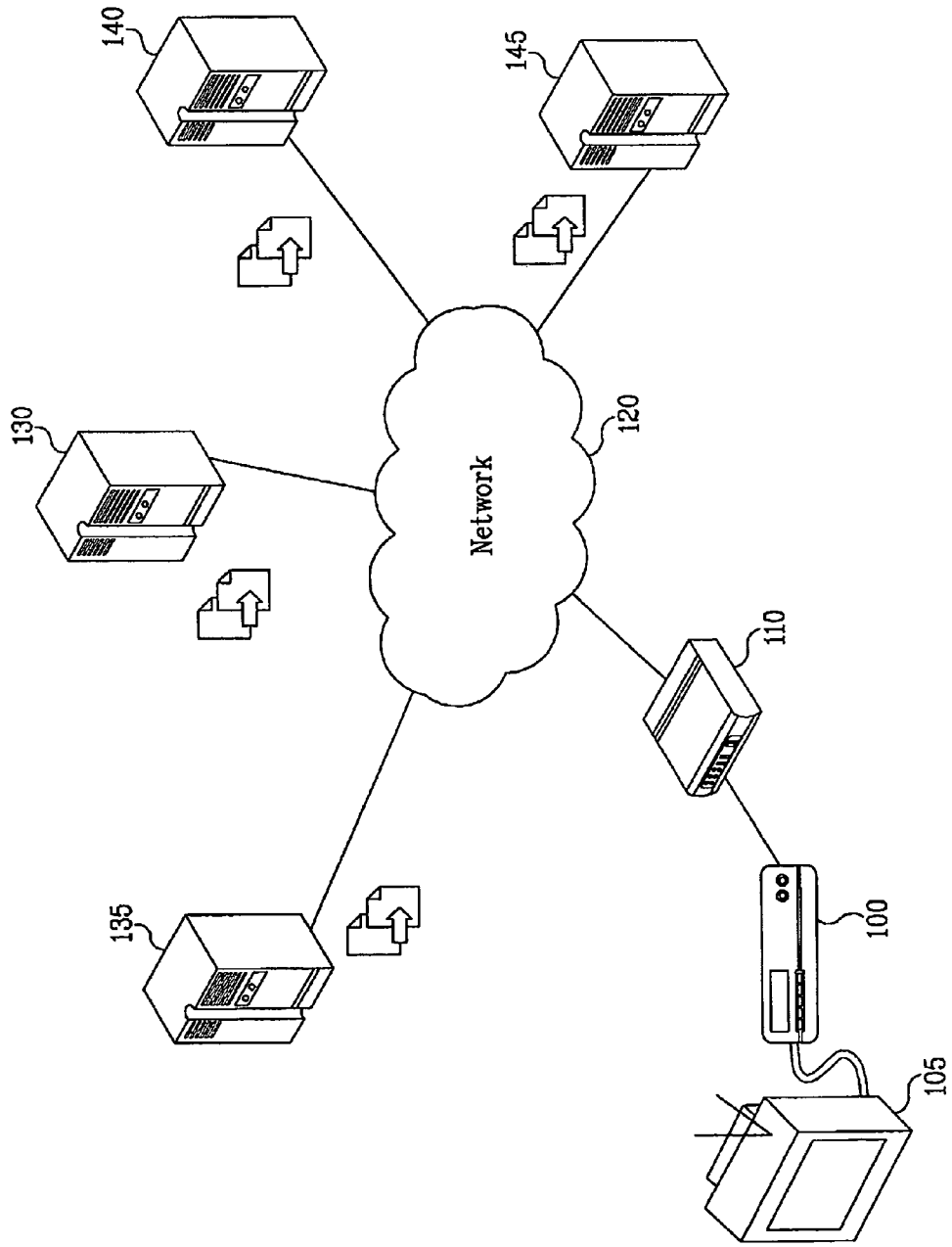
FIG. 1 illustrates a general view describing an IPTV environment that can provide a widget service according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Hereinafter, preferred embodiments of the IPTV receiver and method for controlling an application in the IPTV receiver according to the present invention will now be described in detail with reference to the following drawings. Hereinafter, in the description of the present invention, the term "video widget application" will refer to an application, which corresponds to one of the applications used in an IPTV environment, and, more particularly, to a widget application for applying a video filter to a video content. Herein, the video content may include all types of images including moving pictures, as well as still pictures, such as photographs or pictures.

Also, in the description of the present invention, a method for controlling a video content through a video widget application in an IPTV environment will hereinafter be described in detail. Herein, the control of the video content refers to using the video widget application to apply a video filter to a video content, so as to apply diverse functions of the video filter with respect to a series of video contents, such as modifying the property of the corresponding video content or adding other effects. Also, the description of the present invention provides a standardized framework enabling a widget application, such as the video widget application of the present invention, to be executed in all IPTV receivers, i.e., in an IPTV terminal function (ITF). This is because, in an IPTV environment, the ITF has different hardware and operation system (OS) environment (or condition).

Therefore, according to the present invention, the user may download a video filter applicable to the content via IP and directly apply the downloaded video filter to the corresponding video content, thereby being able to view (or use) the content according to the selected property or effect. Also, in the perspective of the content provider, the video filter may be easily transmitted to the IPTV receiver, thereby enabling special effects to be applied to the corresponding video content. Also, for the convenience in searching and selecting the above-described video filter, the present invention may provide a widget application. Also, in the present invention, a list of video filters applicable to video contents or a receiver profile is managed. And, detailed information may be transmitted to the service provider or the contents provider, so as to be used in the searching of video filters. Furthermore, according to the present invention, when an optimal user-designated video filter is set-up, the widget application uses Broadband Content Guide (BCG) information or category information of a Content on Demand (CoD) Extensible Markup Language (XML) schema, so as to be automatically set-up. Thereafter, configuration information on the widget application for each user (i.e., user profile) is stored so as to be managed by the IPTV service provider, thereby enabling the user to use his (or her) own unique Widget application at any location provided with IP connection.

FIG. 1 illustrates a general view describing an IPTV environment that can provide a Widget service according to the present invention.

Referring to FIG. 1, in an IPTV environment, a widget service is serviced from a server to a receiver through a network 120. The server may include a contents provider 130, a receiver manufacturer (or consumer manufacturer) server 135, and service providers, such as Widget service providers 140 and 145. Herein, the contents provider 130 manufactures contents included in an IPTV service. The receiver may include an IPTV receiver 100, a display device 105, and a delivery network gateway (DNG) 110. The display device 105 outputs the IPTV service received through the IPTV receiver 100. The delivery network gateway (DNG) 110 helps the IPTV receiver 100 to access the Internet. Herein, the network 120 may correspond to an open Internet (or unmanaged network) or a managed network.

Referring to FIG. 1, as an example, the widget service is described to be provided to widget service providers 140 and 145, which correspond to a type of service provider. Therefore, the widget service may also be provided through a content provider 130 or a receiver manufacturer (or consumer manufacturer) server 135. Hereinafter, according to the present invention, a video widget application will be given as an example of the widget service. However, this is merely exemplary, and, therefore, a widget application performing other functions may also be included herein.

Figure 2:
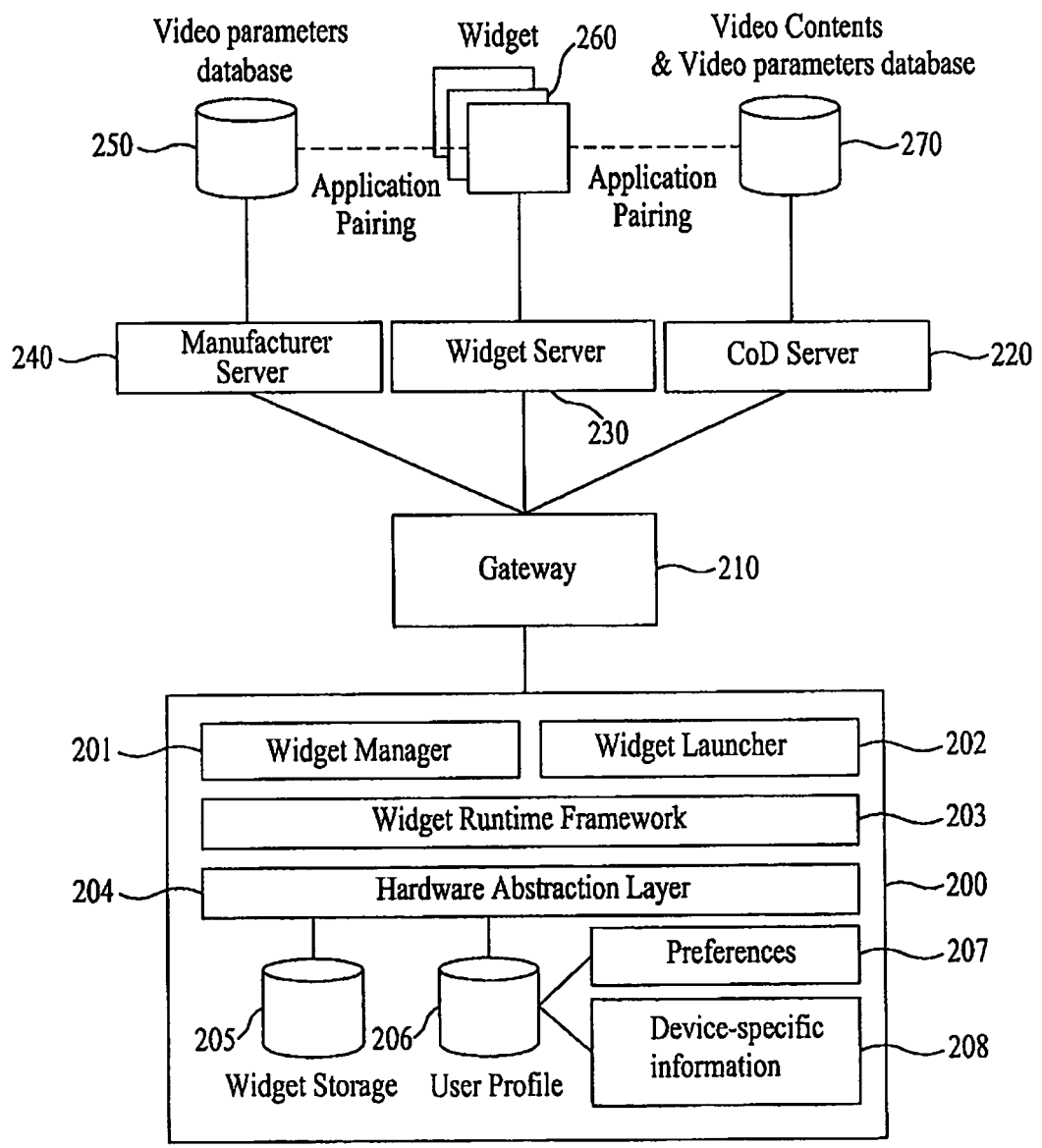
FIG. 2 illustrates an exemplary diagram for specifying a deployment process of a widget application in an IPTV environment according to the present invention.

FIG. 2 illustrates an exemplary diagram for specifying a deployment process of a Widget application in IPTV environment according to the present invention.

Referring to FIG. 2, the widget service is transmitted from a server to an accessible ITF 200 through a gateway 210. The server may include a CoD server 220, a widget server 230, and a manufacturer server 240. The CoD server 220 corresponds to a server that provides CoD services. Herein, the CoD server 220 includes a database having video contents and related video parameters stored therein. The manufacturer server 240 corresponds, for example, to a server for manufacturers manufacturing the ITF, and the manufacturer server 240 includes a database having video parameters adequate for the ITF manufactured by the manufacturers. The widget server 230 corresponds to a service provider providing a video widget application. Herein, the widget server 230 may directly manufacture and provide a video widget application or may receive a manufactured video widget application, thereby servicing the corresponding video Widget application. Furthermore, the widget server 230 may share information with databases 250 and 270 in other servers via application pairing, so as to manufacture and service a widget application.

The ITF 200 may include one or more modules for executing the widget application, a widget storage unit 205 for storing the widget application, and a user profile storage unit 206. In FIG. 2, as the modules for executing the widget application, the ITF 200 may include a widget manager 201, a widget launcher 202, and a widget runtime framework 203. The ITF 200 also includes a widget storage unit 205 for storing the widget application and a user profile storage unit 206, both being subordinate to the hardware abstraction layer 204. However, the structure of the ITF shown in FIG. 2 is merely an example showing a minimum structure associated with the widget application operation. Therefore, the present invention will not be limited only to the example shown in FIG. 2.

The widget manager 201 may install and manage a widget application received via the gateway 210. The widget launcher 202 may launch the installed widget application in accordance with the User profile 206.

In the above description, the manufacturer server 240 may create device-specific information, such as a widget application or a video parameter, which can control detailed operations of the hardware respective to the ITF, and may distribute the created device-specific information so as to be linked with a $3^{rd}$-party Widget application.

The widget application may be easily downloaded from the ITF 200 and installed. Also, the widget application may use a hardware profile of the IPTV, i.e., a receiver profile and a user profile, so as to identify the widget application that can be installed in accordance with each ITF.

Figure 3:
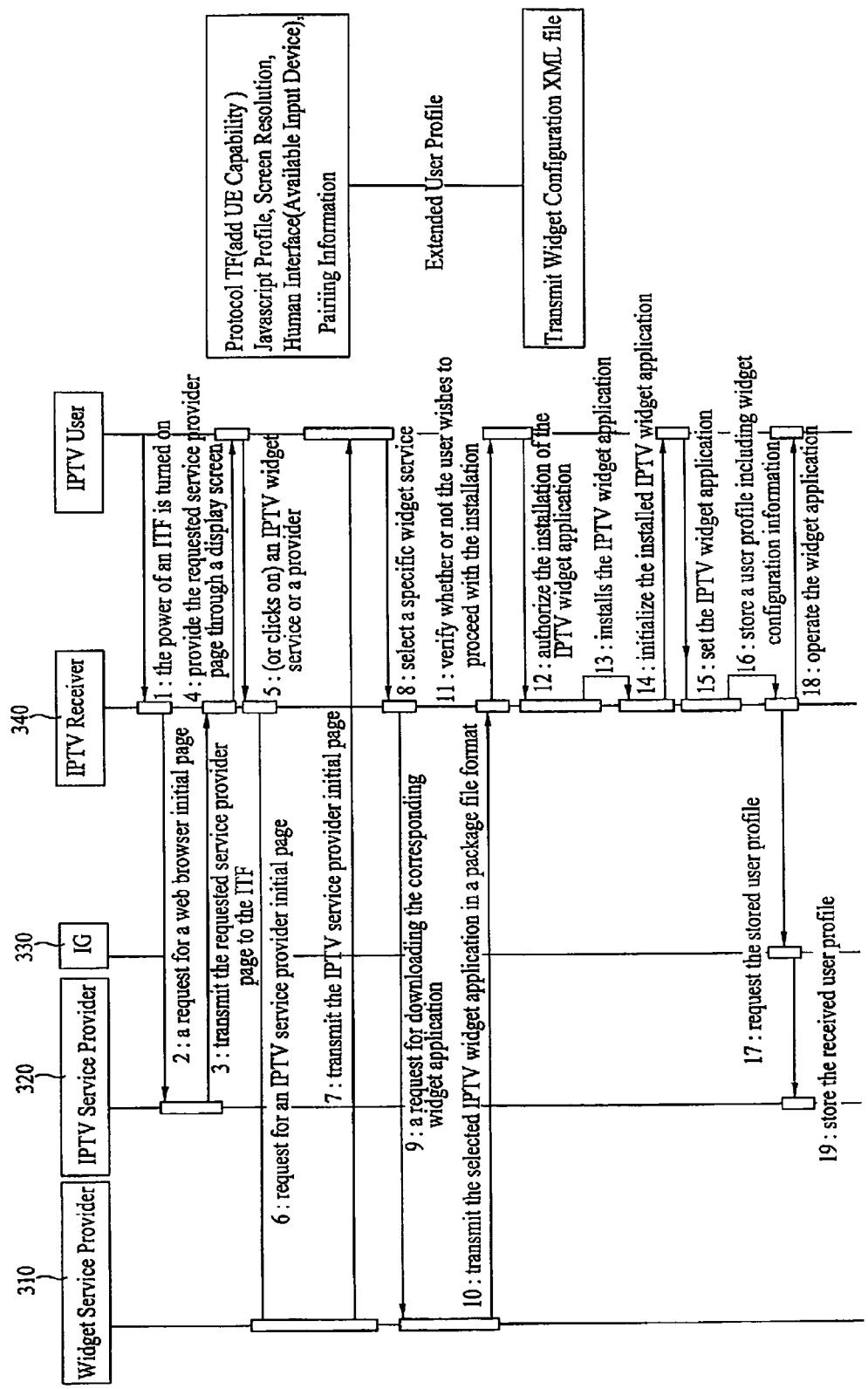
FIG. 3 illustrates an exemplary diagram for specifying a process of providing a widget service in an IPTV service provider according to the present invention.

FIG. 3 illustrates an exemplary diagram for specifying a process of providing a Widget service in an IPTV service provider according to the present invention.

Herein, in an IPTV environment, a widget service provider 310, an IPTV service provider 320, a gateway 330, and an ITF 340 may be involved in the widget servicing process (or the process of providing the widget service). However, the present invention will not be limited only to the example shown in FIG. 3. Therefore, a separate structure associated with the provision of a widget service may be further included in the IPTV environment, or, conversely, part of the structure may be omitted or a specific structure may be replaced with a different structure. For example, in FIG. 3, the widget service provider 310 and the IPTV service provider 320 may correspond to the same entity.

If the power of an ITF 340 is turned on by the user (STEP 1), the ITF 340 sends a request for a web browser initial page to the IPTV service provider 320 (STEP 2). Thereafter, the ITF 340 receives the requested service provider page from the IPTV service provider 320 (STEP 3).

The ITF 340 provides the requested service provider page received from the IPTV service provider 320 to the user through a display screen (STEP 4). Also, the IPTV service provider 320 may correspond to the same entity as an IPTV service profile Functional Entity (FE). Moreover, the IPTV service provider 320 may correspond to the IPTV service provider determined by default setting by the ITF 340.

When the user selects (or clicks on) an IPTV widget service or a provider from the initial page provided through the display screen (STEP 5), the ITF 340 accesses the widget service provider 310 and requests for an IPTV service provider initial page (STEP 6). According to the request, the widget service provider 310 transmits the IPTV service provider initial page to the ITF 340, and the ITF 340 provides the received IPTV service provider initial page to the user through the display screen (STEP 7). Herein, the widget service provider 310 may correspond to the same entity as an IPTV application FE. Also, as described above, when the user selects (or clicks on) an IPTV widget service or a provider, and when the corresponding initial page is requested, the ITF 340 may transmit the profile of the ITF 340 (i.e., receiver profile) to the widget service provider 310 in accordance with the related protocol along with the request.

When the user selects a specific widget service (STEP 8), the ITF 340 sends a request for downloading the corresponding widget application to the widget service provider 310, which provides the selected widget service (STEP 9). Based upon the download request received from the ITF 340, the widget service provider 310 transmits the selected IPTV widget application in a package file format (STEP 10). During this process, the user may search a widget application from the IPTV widget service page displayed on the display screen of the ITF 340. More specifically, the user may search for a widget application suitable for a user equipment class (UE) capacity.

In relation to the IPTV widget application within the package received from the widget service provider 310, the TIF 340 may verify whether or not the user wishes to proceed with the installation through an on-screen display (OSD) (STEP 11). Based upon the verified result, if the user wishes to install the application, the ITF 340 authorizes the installation of the IPTV widget application within the received package (STEP 12).

If the authorization is transmitted by the user, the ITF 340 installs the IPTV widget application included in the received package (STEP 13). Subsequently, the ITF 340 initializes the installed IPTV widget application (STEP 14) and provides the installed and initialized IPTV widget application to the user. Thereafter, the ITF 340 receives the IPTV widget application settings from the user (STEP 15).

The ITF 340 stores a user profile including widget configuration information set-up by the user in relation with the installed IPTV widget application (STEP 16). Then, the ITF 340 requests the stored user profile to pass through the gateway 330 and stored in the IPTV service provider 320 (STEP 17). Accordingly, the IPTV service provider 320 stores the received user profile (STEP 19). During this process, the ITF 340 may operate the widget application in which the user settings have been applied (STEP 18). In the example given in FIG. 3, the user profile is stored in the IPTV service provider 320. However, this is merely exemplary. Accordingly, in another example, the user profile may be alternatively stored in the widget service provider 310. The user profile may be differentiated according to each user by the server 310 and/or 320, thereby being stored in the respective database. Therefore, the user may access the server at any time and any place and call his (or her) own user profile information, thereby being able to use his (or her) own unique widget application from an ITF different from his (or her) own ITF.

Hereinafter, the receiver profile and the user profile of FIG. 3 will be described in more detail with reference to FIG. 4, FIG. 5, and FIG. 6.

Figure 4:
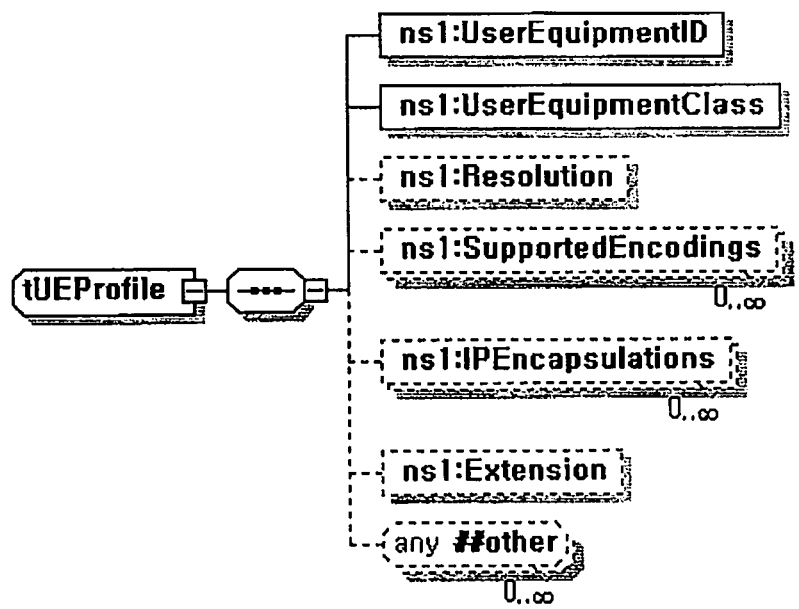
FIG. 4 illustrates a schematic diagram of a receiver profile configured according to a first embodiment of the present invention.

FIG. 4 illustrates a schematic diagram of a receiver profile configured according to a first embodiment of the present invention. FIG. 5 illustrates a schematic diagram of a receiver profile configured according to a second embodiment of the present invention. And, FIG. 6 illustrates a diagram showing an XML schema of FIG. 5.

By searching/browsing a widget application and by transmitting information associated with execution conditions (or environment) of the widget application, such as ITF functions, available resource amount (or size), and so on, to the server in order to download the searched widget application, the ITF may be capable of optionally downloading the adequate widget application.

Hereinafter, the above-described receiver profile transmitted from the ITF will be specified as follows.

Referring to FIG. 4, the user profile includes a UserEquipmentID element, a UserEquipmentClass element, a Resolution element, a SupportedEncodings element, an IPEncapsulations element, and an Extension element.

The UserEquipmentID element includes a model Unique Identifier (UID) of the corresponding ITF. The Resolution element includes video resolution information of the corresponding ITF. And, the SupportedEncodings element includes information on the video frequency of the corresponding ITF.

Figure 5:
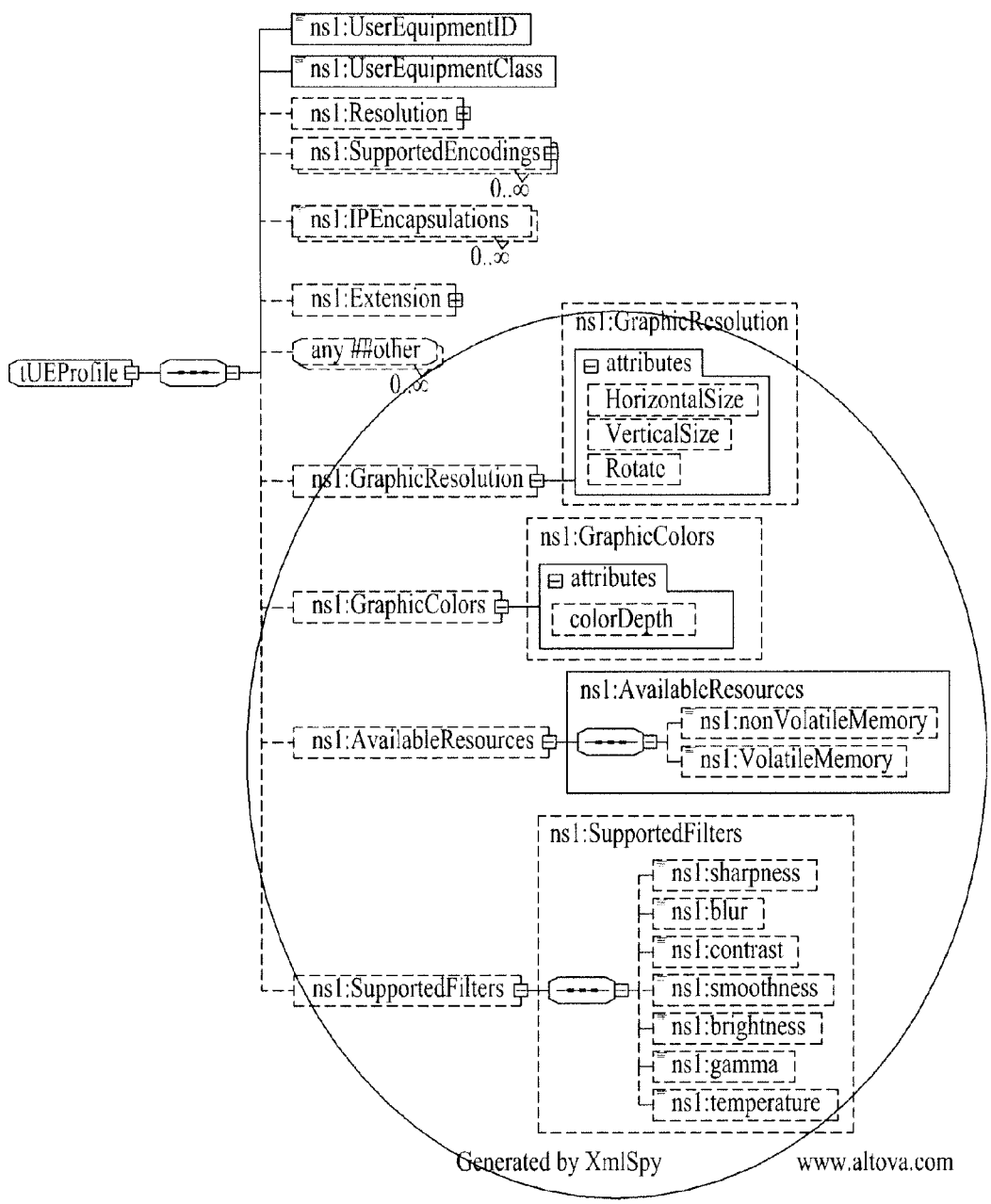
FIG. 5 illustrates a schematic diagram of a receiver profile configured according to a second embodiment of the present invention.

The receiver profile of FIG. 5 further includes a Graphic Resolution element, a Graphic colors element, an Available Resources element, and a Supported Filters element in addition to the receiver profile shown in FIG. 4.

Referring to FIG. 5 and FIG. 6, the Graphic colors element is defined as a tGraphicColor Type and includes information indicating the processing ability of the ITF on the graphic color. Herein, the graphic color refers to a bit-depth of each pixel, when graphic data are rendered to the OSD. The tGraphicColor Type can be defined based on a color depth attribute. Any one value of 32 bpp, 24 bpp, 16 bpp, and 8 bpp may be given as an enumeration value of the color depth attribute.

The Graphic Resolution element is defined as a tGraphicResolution Type and includes information indicating the processing ability of the ITF on the graphic resolution. Herein, the graphic resolution refers to a resolution of OSD graphic that can be used by the widget application. The tGraphicResolution Type can be defined based on a horizontal size attribute, a vertical size attribute, and a rotation attribute.

The Available Resources element is defined as a tAvailableResolution Type and includes information indicating the available resource amount for the widget application. Herein, the resource amount refers to a non-volatile memory and a volatile memory.

The Supported Filters element is defined as a tSupportedFilters Type and includes information indicating a function, among many video filter functions, that can be executed by the user equipment. Therefore, among the video filter functions described in the present invention, the user equipment may transmit executable filters to the server, thereby being able to download and use only the video widget application that can be used by the user equipment. Herein, filter functions may include sharpness, blur, contrast, smoothness, brightness, gamma, temperature, and so on.

Figure 7:
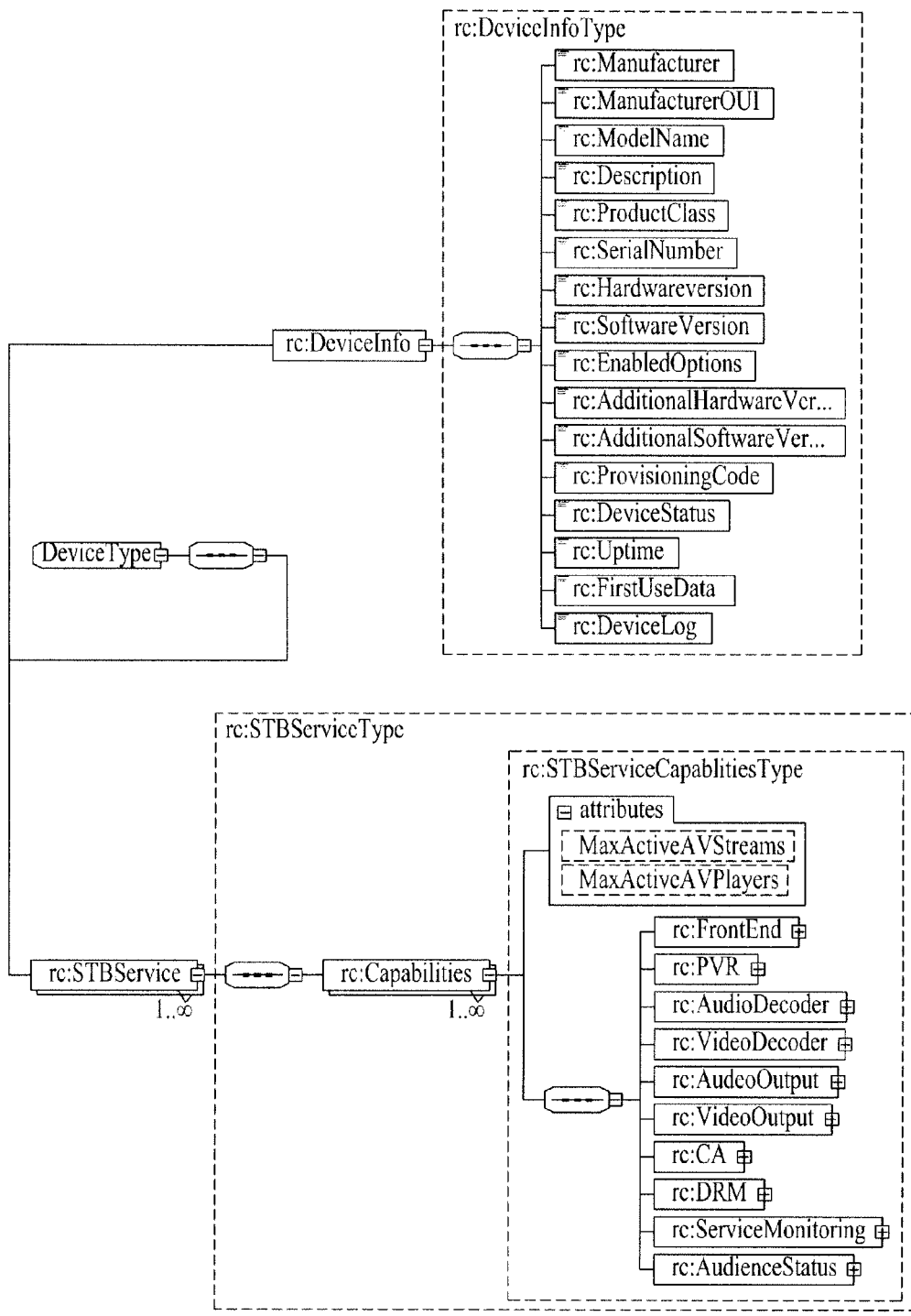
FIG. 7 illustrates a schematic diagram of a receiver profile configured according to a third embodiment of the present invention.

FIG. 7 illustrates a schematic diagram of a receiver profile configured according to a third embodiment of the present invention.

The receiver profile according to the third embodiment of the present invention includes information related to receiver capabilities. Such information related to receiver capabilities (or performance) is largely divided into a DeviceInfo element, which is defined as a DeviceInfo Type, and an STBService element, which is defined as an STBService Type.

The DeviceInfo element may include a Manufacturer element, a Manufacturer OUI element, a Model Name element, a description element, a productclass element, a serial number element, a hardware version element, a software version element, an enabled options element, an additional hardware version element, an additional software version element, a provisioning element, a device status element, an Uptime element, a first use data element, and a device log element.

The STBService element may include a FrontEnd element, a Personal Video Recorder (PVR) element, an AudioDecoder element, a VideoDecoder element, an AudioOutput element, a VideoOutput element, a Conditional Access (CA) element, a Digital Rights Management (DRM) element, a ServiceMonitoring element, and an AudienceStatus element. Also, attributes of the STBService element may be a MaxActiveAVStreams attribute and a MaxActiveAVPlayers attribute.

Figure 8:
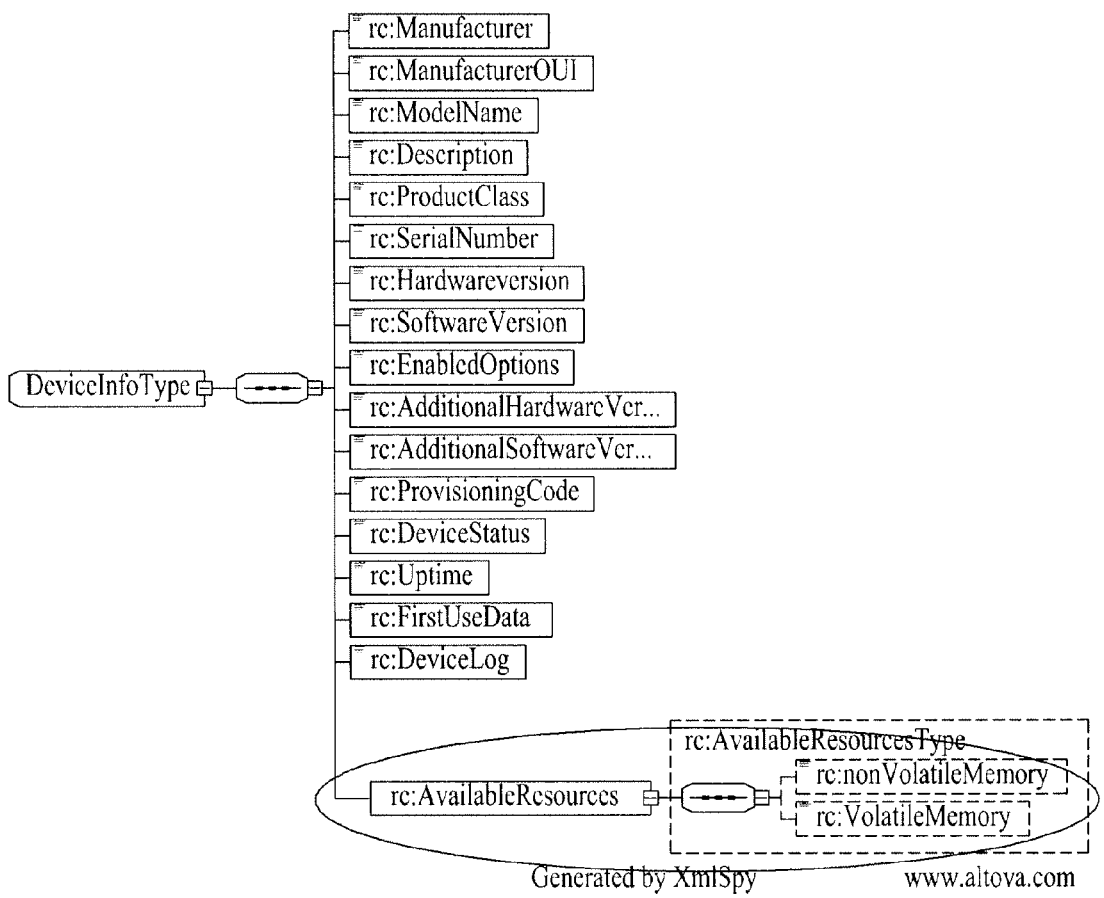
FIG. 8 illustrates a schematic diagram of a receiver profile configured according to a fourth embodiment of the present invention.

FIG. 8 illustrates a schematic diagram of a receiver profile configured according to a fourth embodiment of the present invention. And, FIG. 9A and FIG. 9B illustrate a diagram showing an XML schema of FIG. 8.

In FIG. 8, the DeviceInfo element of FIG. 7 further includes an AvailableResources element on available resource information for executing the widget application. The AvailableResources element may include a nonVolatileMemory element and a VolatileMemory element.

Referring to the FIG. 9A and FIG. 9B, sub-elements of the DeviceInfo element is specified as follows.

The DeviceInfo element is defined as a type of an object, wherein the object contains general device information. The Manufacturer element is defined as a type of string (64) and descriptive of a manufacturer of the CPE (human readable string). The Manufacturer OUI element is defined as a type of string (6) and descriptive of structurally unique identifier of the device manufacturer. The Model Name element is defined as a type of string (64) and descriptive of a model name of the CPE (human readable string). The description element is defined as a type of string (256) and descriptive of a full description of the CPE device (human readable string). The productclass element is defined as a type of string (64) and descriptive of an identifier of the class of product to which the serial number applies. In other words, for a given manufacturer, this parameter is used to identify the product or class of for product for which the SerialNumber parameter is unique. The serial number element is defined as a type of string (64) and descriptive of a serial number of the CPE.

The hardware version element is defined as a type of string (64) and descriptive of a string identifying the particular CPE model and version. The software version element is defined as a type of string (64) and descriptive of a string identifying the software version currently installed in the CPE. The enabled options element is defined as a type of string (1024) and descriptive of a comma-separated list (maximum length 1024) of strings. The Comma-separated list corresponds to a list of the OptionName for each Option that is currently enabled in the CPE. The OptionName for each option is identical to the OptionName element of the OptionStruct. Only these options are listed, wherein the respective State indicates that the corresponding option is enabled. The additional hardware version element is defined as a type of string (64) and descriptive of a comma-separated list (maximum length 64) of strings. The comma-separated list of any additional version represents any additional hardware version information a vendor may wish to supply. The additional software version element is defined as a type of string (64) and descriptive of a comma-separated list (maximum length 64) of strings. The comma-separated list of any additional version represents any additional software version information the vendor may wish to supply.

The provisioning element is defined as a type of string (64) and descriptive of an identifier of the primary service provider and other provisioning information, so as to determine service provider-specific customization and provisioning parameters. The device status element is defined as a type of string (64) and descriptive of a current operational status of the device. The current operational status corresponds to any one of 'up', 'initializing', 'error', and 'disabled'. The Uptime element is defined as a type of unsignedInt and descriptive of the time in seconds since the CPE was last restarted. The first use data element is defined as a type of dateTime and descriptive of a date and time in Universal Time Coordinated (UTC) that the CPE first successfully established an IP-layer network connection and acquired an absolute time reference using NTP or equivalent over the network connection. The CPE may reset this date after a factory reset. If NTP or equivalent is not available, this parameter, if present, should be set to an Unknown Time value. The device log element is defined as a type of string (32768) and descriptive of a vendor-specific log(s).

The nonVolatileMemory element is defined as a type of unsignedInt and descriptive of the amount (or size) of an available non-volatile memory. The VolatileMemory element is defined as a type of unsignedInt and descriptive of the amount (or size) of an available volatile memory.

Figure 10:
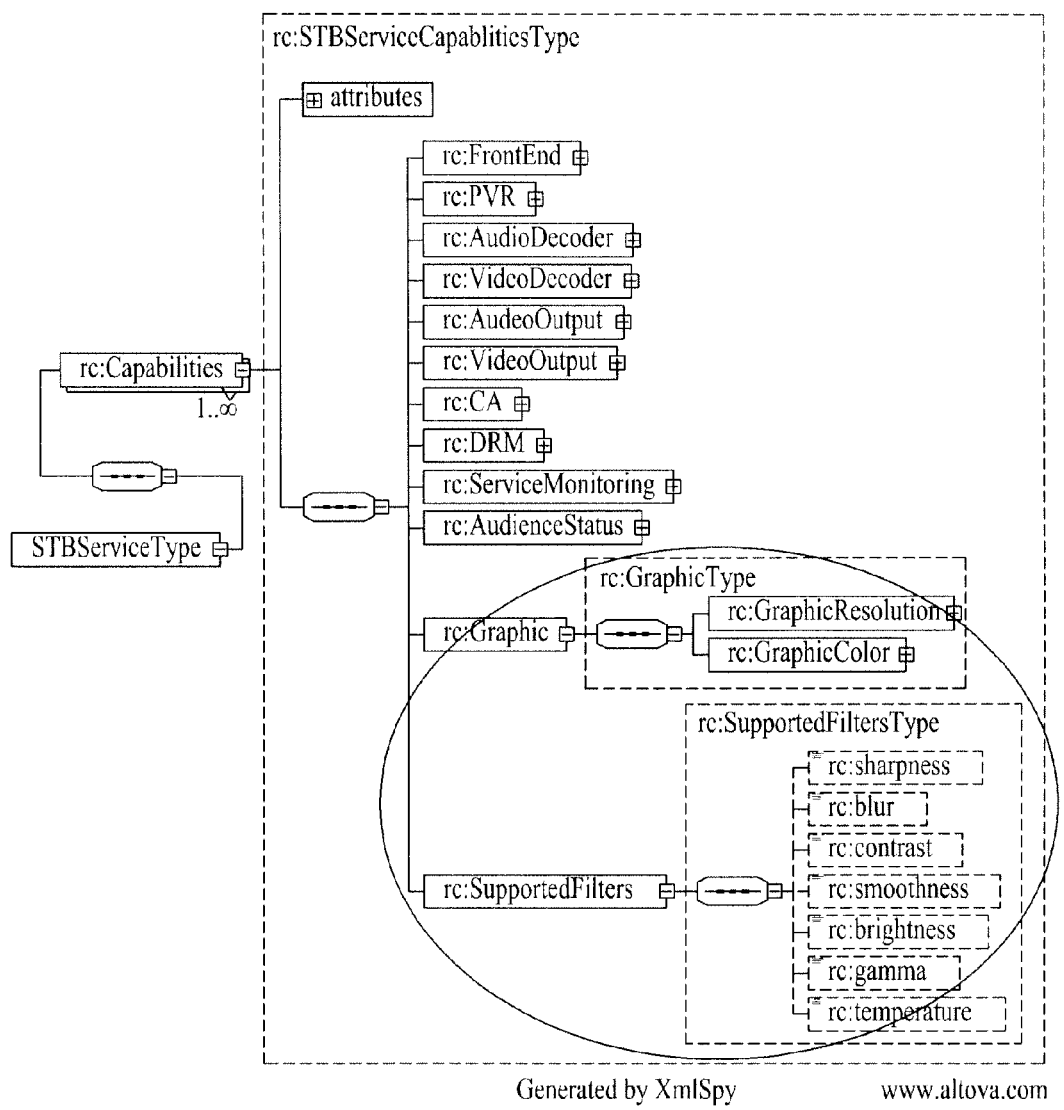
FIG. 10 illustrates a schematic diagram of a receiver profile configured according to a fifth embodiment of the present invention.

FIG. 10 illustrates a schematic diagram of a receiver profile configured according to a fifth embodiment of the present invention. And, FIG. 11 illustrates a diagram showing an XML schema of FIG. 10.

In FIG. 10, the STBService element of FIG. 7 further includes a Graphic element for describing (or specifying) OSD graphic functions of a set-top, and a SupportedFilters element for specifying a supportable video filter function. The Graphic element may include a GraphiResolution element and a GraphicColor element.

Referring to the FIG. 11, sub-elements of the STBService element are specified as follows.

The FrontEnd element is descriptive of a function of the front end, which acts as an interface between the network and the inner functional blocks of the STB. The PVR element is descriptive of a function of the PVR, which stores programs coming (or delivered) from any Front End and sends stored programs to audio and/or video decoders or to the (output) IP front end. The AudioDecoder element is descriptive of a function of the audio decoder, which receives an elementary audio stream, decodes the audio, and outputs an uncompressed native audio stream to an audio output object. The VideoDecoder element is descriptive of a function of the video decoder, which receives an elementary video stream, decodes the video, and outputs an uncompressed native video stream to a video output object. The AudioOutput element is descriptive of a function of the audio output, which receives uncompressed audio streams from one or more audio decoders and performs format adaptations. The VideoOutput element is descriptive of a function of the video output, which receives uncompressed video streams from one or more video decoders, and performs format adaptations. The CA element is descriptive of a function of the CA component, which contains details of one of the CA mechanisms that may be supported by the STB. The DRM element is descriptive of a function of the DRM component, which contains details of one of the DRM mechanisms that may be supported by the STB. The ServiceMonitoring element is descriptive of a service monitoring statistics, which are collected based upon service types. The main reason for defining service types is that the service types correspond to different protocol stacks and configurations, and statistics collected across multiple service types would be meaningless. Finally, the AudienceStatus element is descriptive of a statistics, which contains audience viewing statistics, organized by channels.

Furthermore, since the Graphic element and the Supported Filters element further included in FIG. 10 and FIG. 11 are identical to those shown in FIG. 5, detailed description of the same will be omitted for simplicity.

The above-description consists of details on the receiver profile of the ITF. Hereinafter, the user profile will now be described in detail. In the following description, when the user uses a video widget application according to the present invention for the respective video content in order to apply the video filter, the user profile may include all content modified according to the user settings made during this process (e.g., settings that change values of particular functions).

Figure 12:
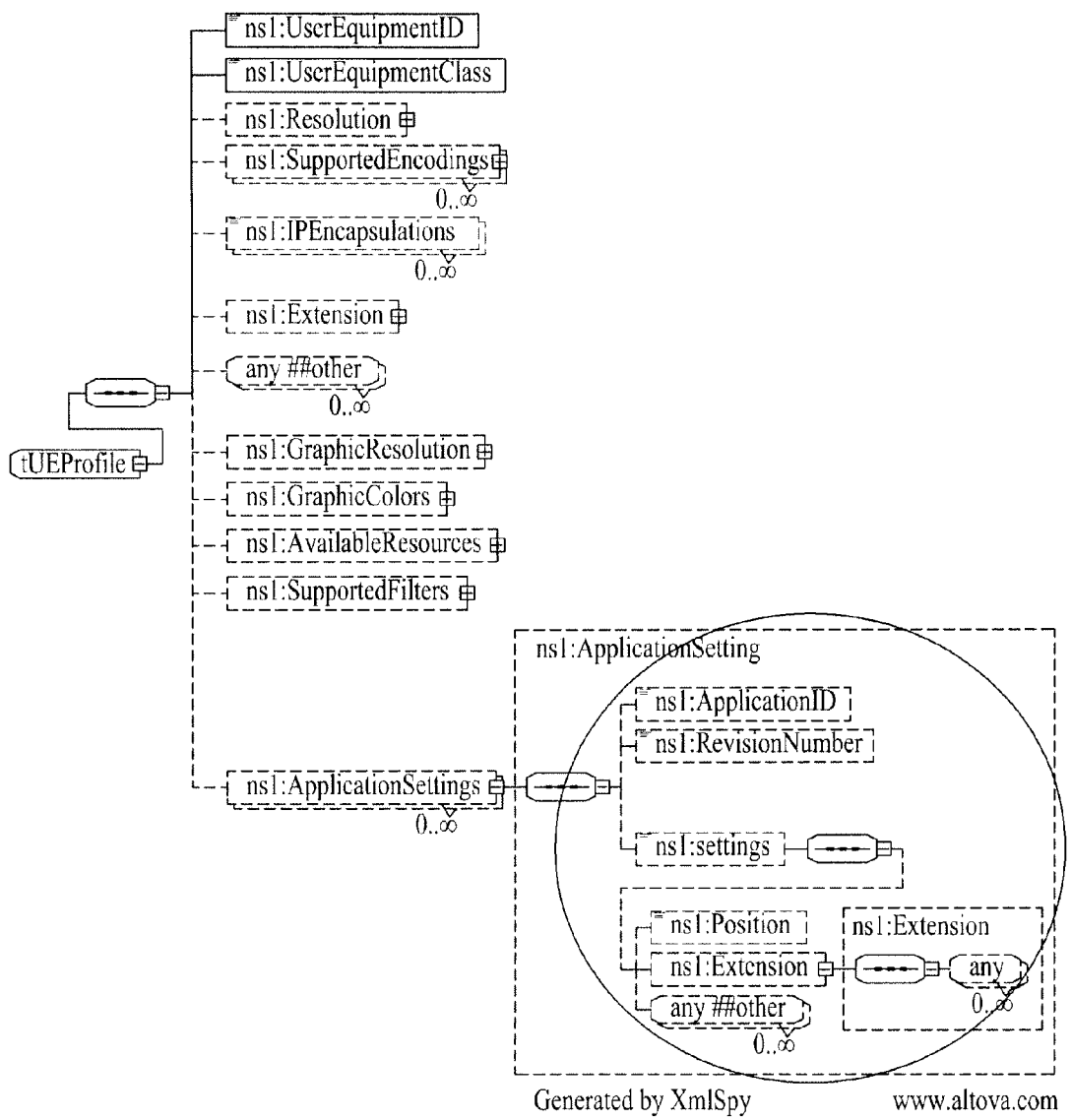
FIG. 12 illustrates a schematic diagram of a user profile configured according to an embodiment of the present invention.

FIG. 12 illustrates a schematic diagram of a user profile configured according to an embodiment of the present invention. And, FIG. 13 illustrates a diagram showing an XML schema of FIG. 12.

FIG. 12 and FIG. 13 illustrate a UE profile. The UE profile manages information on widget applications that have been installed for each ITF and the respective environment settings as the user's profile. Accordingly, the UE profile enable the user to use his (or her) own settings without any modification even when the user accesses a related service through any terminal (or user equipment) other than his (or her) own user equipment.

Hereinafter, among the elements included in the user profile, detailed description of the elements that are identical to those included in the receiver profile will be omitted for simplicity. Accordingly, only the elements that are newly introduced will be described in detail. Referring to FIG. 12 and FIG. 13, unlike the receiver profile, the user profile includes an ApplicationSettings element. The ApplicationSettings element may include an ApplicationID element, a RevisionNumber element, and a Settings element. The ApplicationID element corresponds to an element respective to an identifier that can uniquely identify each widget application. The RevisionNumber element corresponds to an element that indicates the version of each widget application. Therefore, the ApplicationID and version information for each widget application are stored in the user profile, thereby being able to call upon a specific widget application. Furthermore, the Settings element corresponds to an element that stores user-specific set-up information for each widget application. Herein, the Settings element includes a Position element, an Extension element, and other elements. More specifically, the Position element indicates position information of each widget application within the overall list of widget applications. And, the Extension element and other elements indicate information on environment settings for each widget application. Accordingly, by storing the widget application installed in each ITF and the information on the environment settings for each widget application in the server through the user profile information, the user may be able to easily use the same environment even when using a related service through any random ITF.

Hereinafter, the processes of downloading and installing, upgrading, and deleting video widget applications in an ITF will be described in detail with reference to FIG. 3 to FIG. 13.

Figure 14:
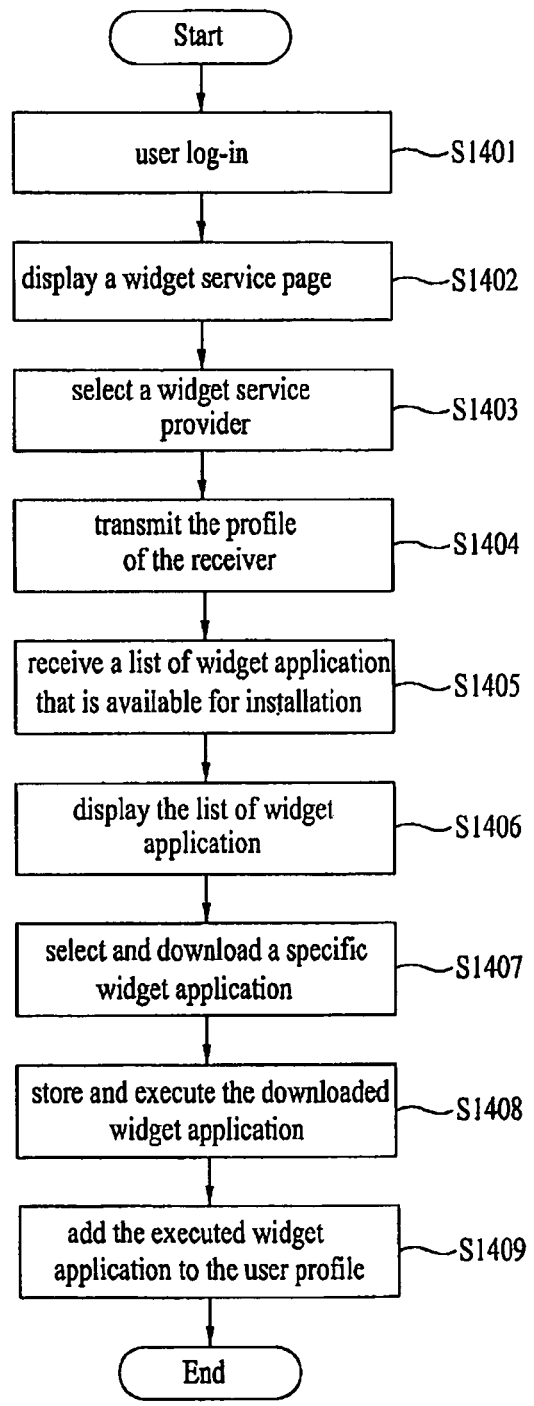
FIG. 14 illustrates a flow chart showing exemplary process steps for installing a video widget application in the ITF according to the present invention.

FIG. 14 illustrates a flow chart showing exemplary process steps for installing a video widget application in the ITF according to the present invention.

When the user turns on the power of the ITF and logs-in (S1401). Then, the ITF outputs and displays a widget service page on a display screen (S1402).

When the user selects a widget service provider (S1403), the ITF transmits the profile of the receiver to the selected widget service provider (S1404).

Based upon the profile of the receiver transmitted from the widget service provider, the ITF outputs and displays a list of widget applications (or widget application list) that are available for installation on the display screen (S1405).

Thereafter, when the user selects a specific widget application from the displayed widget application list, the selected widget application is downloaded (S1406).

The ITF stores the downloaded widget application and executes the downloaded widget application (S1407).

Thereafter, the ITF adds the executed widget application to the user profile (S1408).

In step 1404, the ITF transmits the receiver profile to the selected widget service provider.

More specifically, in order to search/browse a widget application and download the searched/browsed widget application to an IPTV receiver, information associated with the environment for executing the widget application, such as ITF functions or the amount of available resource, are transmitted to the widget service provider, i.e., the widget server. Accordingly, based upon the receiver profile, the ITF may optionally (or selectively) download the adequate widget application that is available for installation from the widget server.

Therefore, it is preferable that the ITF includes essential functions associated with widget application installation and execution in the receiver profile and transmits the receiver profile to the widget server. As shown in FIG. 14, when a widget application is installed, the user may interactively apply an independent filter and processing method to the video area through the display screen.

Figure 15:
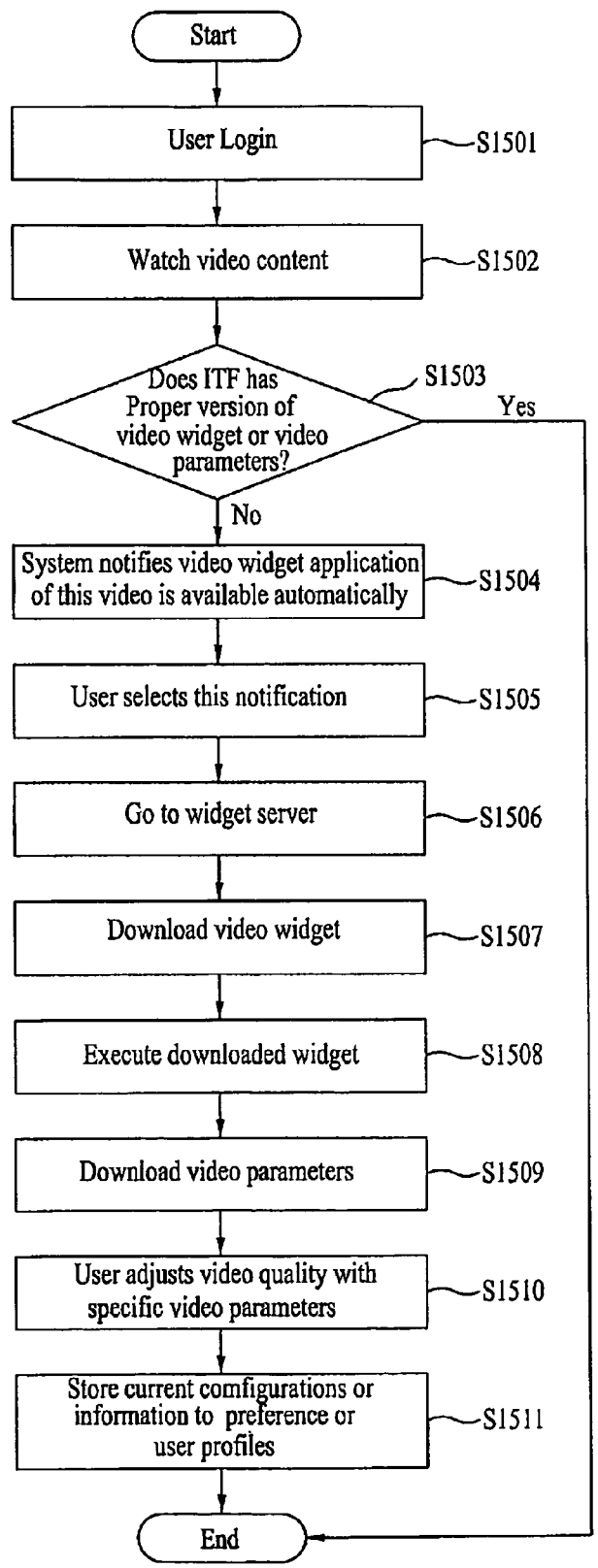
FIG. 15 illustrates a flow chart showing exemplary process steps for installing a video widget application when viewing a video content according to the present invention.

FIG. 15 illustrates a flow chart showing exemplary process steps for installing a video Widget when viewing a video content according to the present invention.

More specifically, FIG. 15 illustrates how the video widget application is to be installed when viewing (or watching) the video content. Herein, the exemplary process may be divided into a case where a video widget application and a video parameter are downloaded when viewing the video content, and a case where the user downloads a video widget application from the server firsthand and uses the downloaded video widget application when viewing the video content.

When the user turns on the power of the ITF, i.e., when the user logs-in (S1501), a video content is viewed (or watched) (S1502).

The ITF first determines whether the adequate version for the video widget application or video parameters is already stored in the ITF (S1503).

Then, depending upon the result of step 1503, respective to the corresponding video content or video frame, the ITF automatically provides an available video widget application to the user (S1504).

Thereafter, when the corresponding video widget application is selected by the user (S1505), the ITF accesses a widget server that provides the video widget application (S1506).

The ITF downloads the video widget application from the accessed widget server (S1507) and, then, executes the downloaded video widget application (S1508).

Subsequently, the ITF download video parameters (S1509) and uses video parameters selected by the user to adjust the video (or picture) quality of the video content that is being viewed or to be viewed (S1510).

Thereafter, the ITF stores the information on the current configuration or preference or the user profile (S1511).

In the above description, a widget manager within the ITF may download a widget application and video parameters associated with the video content that is viewed. The download method may include a method of downloading through a unicast connection with (or access to) the server and a method of directly downloading through a multicast channel using a multicast connection with (or access to) the server. Herein, the multicast method is mostly used for broadcast programs. When a video content is transmitted via multicast channel, a supplemental service, such as the widget application, may be transmitted to another multicast channel. Such information may be notified to the receiver generally along with BCG information or Service Discovery and Selection (SD&S) information (i.e., widget application Uniform Resource Identifier (URI) or video parameter URI). Furthermore, in the multicast method, if the receiver is scheduled with reserved viewing or reserved recording, an environment enabling the widget application or video parameters to also be downloaded and executed along with the reserved program may be provided.

Figure 16:
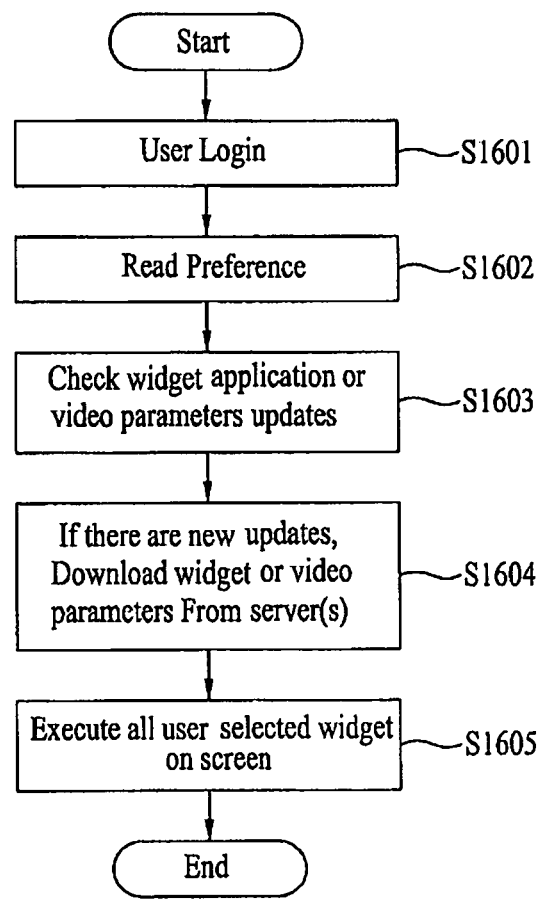
FIG. 16 illustrates a flow chart showing exemplary process steps for upgrading the video widget application and video parameters when the user logs-in according to the present invention.

FIG. 16 illustrates a flow chart showing exemplary process steps for upgrading the video Widget and video parameters when the user logs-in according to the present invention.

FIG. 16 shows a method performed by the widget manager to read the version information of the video widget application and video parameters, when the user logs-in, and to upgrade the video widget application and video parameters to the latest version. Herein, the widget manager not only upgrades the video widget application but may also upgrade other widget applications as well.

More specifically, when the user turns on the power of the ITF and logs-in (S1601), the ITF reads information on user preference that has been stored in advance (S1602).

Then, the ITF checks whether or not information on the video widget application or the video parameters has been updated (S1603).

Depending upon the result of step 1603, if the corresponding information has been updated, the ITF downloads the updated video widget application or video parameters from the widget server (S1604).

The ITF either executes the newly downloaded the video widget application or applies the newly downloaded video parameters to the already-existing video widget application and executes the processed video widget application (S1605).

Figure 17:
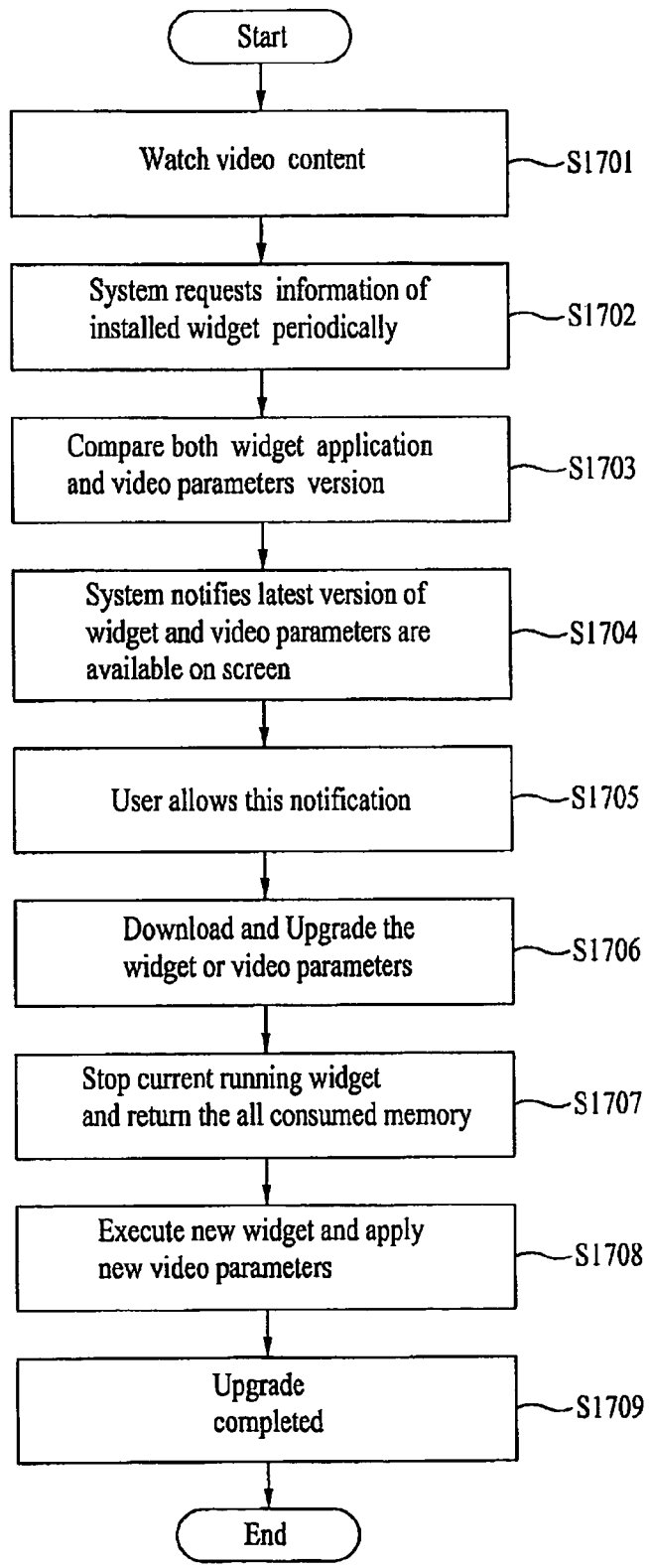
FIG. 17 illustrates a flow chart showing exemplary process steps for upgrading the video widget application and video parameters according to the present invention.

FIG. 17 illustrates a flow chart showing exemplary process steps for upgrading the video Widget and video parameters according to the present invention.

In this case, when playing-back (or reproducing) the video content, other video widget applications or video parameters may be applied herein depending upon the type of the corresponding video content. For example, when the display screen abruptly changes from currently displaying a movie with a dark and obscure background to displaying a sports channel program, since the attributes of both programs (or contents) are different from one another, the ITF may change the video widget application or video parameters either in order to apply the adequate video parameters for the new program, or in accordance with decision made by the video content provider.

When the user is viewing (or watching) a video content (S1701), the ITF periodically requests for information on the installed video widget application and video parameters to the server (S1702), so as to compare the version of the already existing video widget application and video parameters (S1703).

When the latest version of the available video widget application and video parameters is notified by the server, the ITF provides the latest version to the user through the display screen (S1704).

When the user allows the notification, i.e., when the user selects the corresponding video widget application and video parameters (S1705), the ITF downloads the selected video widget application and video parameters and upgrades the existing video widget application and video parameters (S1706).

Once the upgrading process is completed, the ITF discontinues the video widget application that is currently being executed and stores the currently executed video widget application to the memory unit (S1707). Subsequently, the ITF executes the newly upgraded video widget application (S1708).

Figure 18:
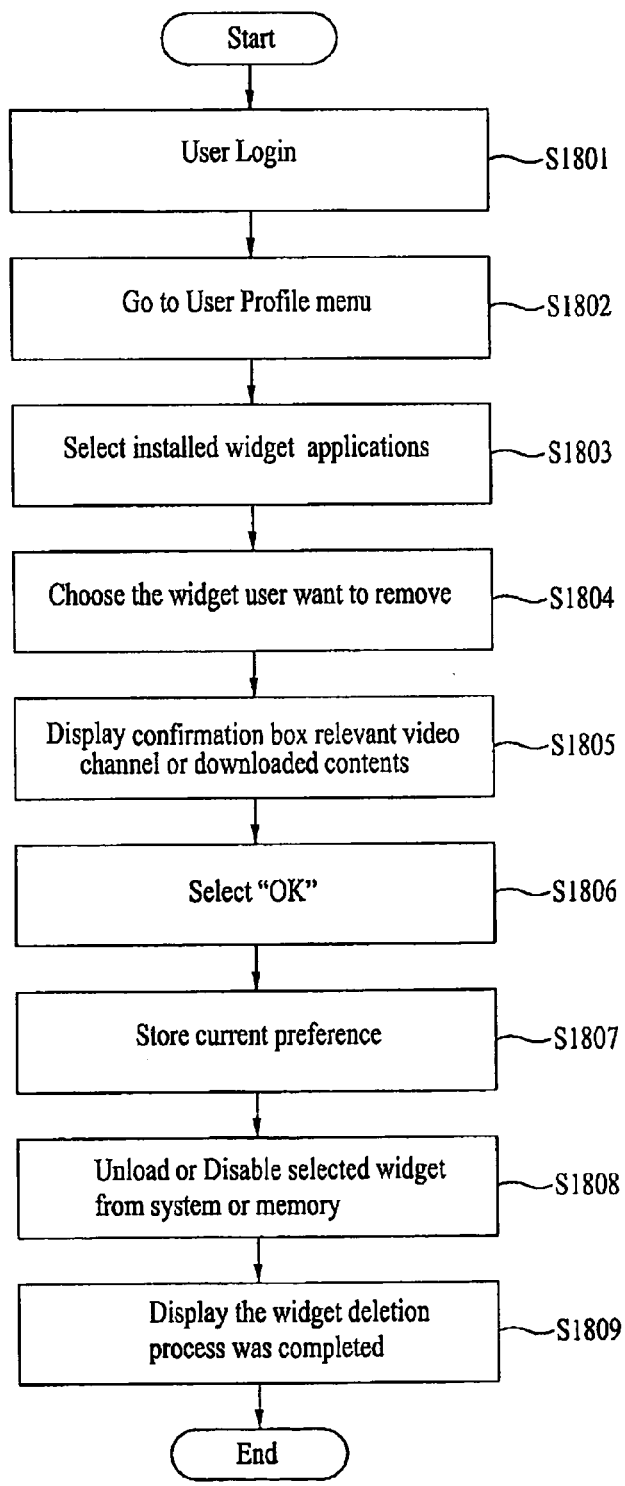
FIG. 18 illustrates a flow chart showing exemplary process steps for having the user delete the video widget application according to the present invention.

FIG. 18 illustrates a flow chart showing exemplary process steps for having the user delete the video widget application according to the present invention.

More specifically, FIG. 18 illustrates a flow chart showing a method for deleting the video widget application through the widget manager within the ITF. The video widget application may be stored in the ITF so as to be executed or may remain in an inactive state. When being executed, a request for deleting the corresponding video widget application from the list of widget applications being executed may be sent to the widget launcher within the ITF. Accordingly, the widget manager deletes information associated with the user profile and user preference. Furthermore, the already-existing widget application is also deleted, and the data used in the deleted widget application are also deleted accordingly.

More specifically, when the user turns on the power of the ITF and logs-in (S1801), the ITF first accesses a user profile menu (S1802), so as to select a list of installed video widget applications (S1803).

Then, the widget application that the user wishes to delete from the list of installed video widget applications the ITF is selected. Thereafter, with respect to the corresponding video channel or downloaded content, the ITF may output a confirmation box in order to verify and confirm the user's selection (or decision) (S1804).

If the user selects an 'OK' input (S1805), the ITF stores the current user preference and, then, the ITF unloads or disables the selected widget application from the system or memory (S1806).

The ITF, then, display the deletion process of the widget application (S1807).

The above description corresponds to details on downloading, installing, upgrading, and deleting a video widget application from the ITF.

Various types of video content may be provided through IP packets. Herein, the types of video content include moving picture (or video), still image, photograph, and so on. However, in the related art broadcasting receiver, by uniformly applying video filters having identical settings to all video contents that are played-back, the related art broadcast receiver was incapable of reflecting the characteristics (or attributes) of each video content. Also, as users are becoming more interested in editing the video contents, the current broadcasting receivers are expected to meet with such demands.

Hereinafter, a method for applying a video filter using a video widget application with respect to a video content that is being played-back in the ITF will now be described in detail. Thus, according to the present invention, the user may be provided with the requested video (or picture) quality or screen effect for the respective video content.

Generally, a video filter may be uniformly applied to all video contents that are being played-back in the ITF, or may be applied to the video content currently being played-back, i.e., all frames within the video content currently being played, or may be applied to only a specific frame.

Hereinafter, an example of applying a video filter to one specific frame of the video content will be given in order to simplify the description of the present invention. However, the present invention will not be limited only to the example given herein. Moreover, the given example will be further divided into a case where the video filter is generally applied to the corresponding frame and a case where the video filter is applied only to a selected area of interest within the corresponding frame.

Hereinafter, a method for applying a video filter to a selected area will now be described in detail with reference to the accompanying drawings. The selection of areas to which the video filter is to be applied may be broadly divided into an object-based selection and a block-based selection. Herein, the selection is based upon a coding method of the video content.

Figure 19:
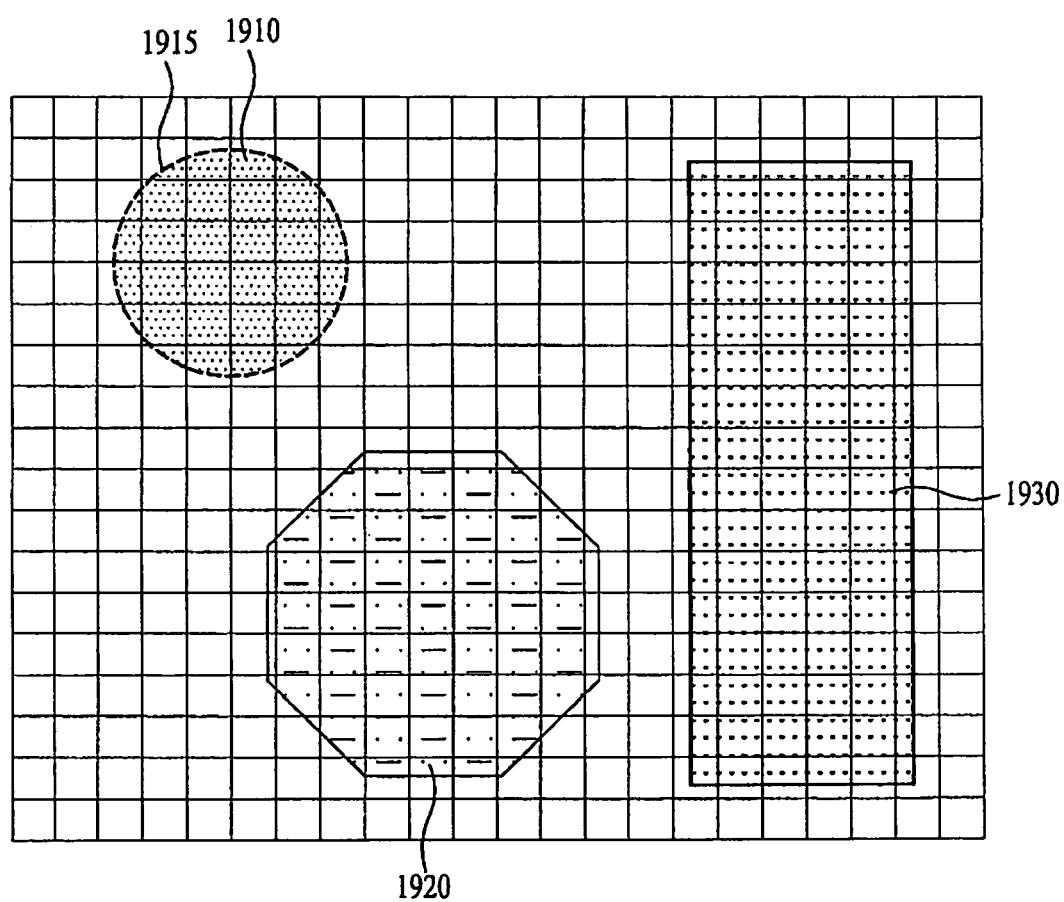
FIG. 19 and FIG. 20 respectively illustrate an object-based selection and a block-based selection according to the present invention.
Figure 20:
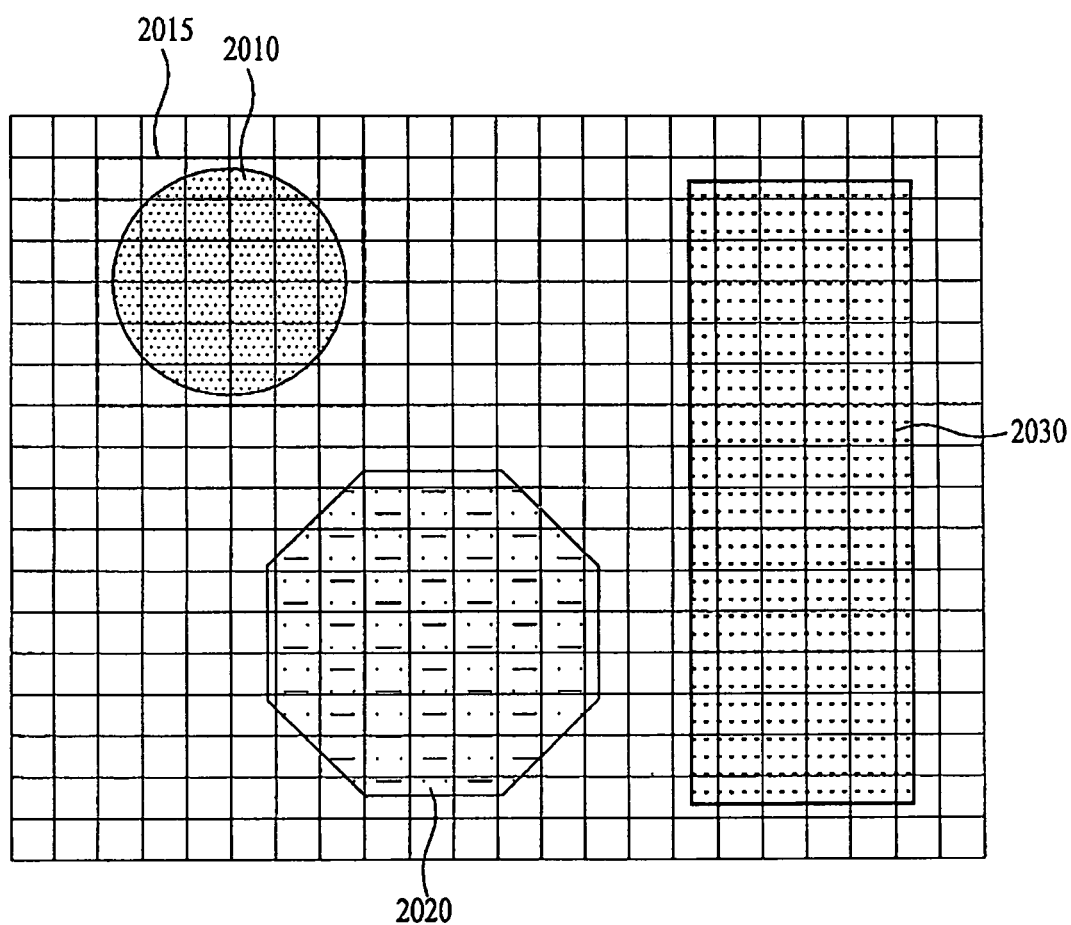

FIG. 19 and FIG. 20 respectively illustrate an object-based selection and a block-based selection according to the present invention. Referring to FIG. 19 and FIG. 20, each lattice represents one block.

FIG. 19 corresponds to a case where the video content is processed with object-based coding. Referring to FIG. 19, 3 objects (1910, 1920, and 1930) exist in one screen. Based upon the user's choice (or selection), the object-based selection 1915 may be made in object units.

FIG. 20 corresponds to a case where the video content is processed with block-based coding. Referring to FIG. 20, 3 objects (2010, 2020, and 2030) exist in one screen. However, as opposed to the case shown in FIG. 19, in FIG. 20, instead of selecting an object 2010 itself, even when an object 2010 is selected, the selection may actually be made only in block or macro-block (MB) units. For example, in the case shown in FIG. 20, even when an indicating means indicates only the corresponding object 2010, depending upon the block-based coding result, the IPTV receiver may obtain only the information on a block 2015 included in the indicated object 2010 or obtain information on the object included in the block along with the information on the block 2015.

FIG. 21 and FIG. 22 illustrate exemplary data structures for mapping a video area and a video display parameter that is used for applying a custom filter according to the present invention.

There should exist a mechanism in the receiver for automatically re-calculating the MB/block number to which the video object display parameter set is applied. A Parameter Set ID (PSID) will be used to provide a link between actual parameters and video object/block number. In case of a dynamic allocation of a video object ID or a block-based video coding, the PSID will be used to maintain the link between actual video display parameters and the video object. This results in a PSID map image or an object/PSID mapping table.

Different parameter values are applied to multiple areas and a variety of parameter combinations may exist depending upon the tools used. Therefore, in order to track how such tools have been applied to each area, the present invention should be able to store how each area and configuration or parameter values for each tool have been applied. In case of the object-based coding process, the object_id itself may collectively specify (or express) each area. Therefore, it is easier to map the object_id with the parameter.

Conversely, in case of the block-based coding process, a method for expressing a group (or collection) of macro-blocks is required. And, such method may be able to macro-blocks having the same parameter values applied thereto as the concept of a single object. Therefore, in addition to being used in the method for collectively identifying (or distinguishing) the parameter values, the concept of the parameter set ID may also be used as an object ID that can gather multiple macro-blocks into a single group. More specifically, the concept of an object in the block-based coding process refers to a group (or collection) of macro-blocks being collectively selected by the user and having a parameter uniformly applied thereto. In other words, in the block-based coding process, the object may be defined as a group of macro-blocks each having the same parameter.

The following describes a data structure for operating a video widget application in the ITF. Examples of the video widget information are defined in Table 1 shown below.

TABLE 1

| Widget Information | Description | Example |
|---|---|---|
| Video Object Information | | |
| Object-based Process | A process of grouping interesting portions or portions having common characteristics within a video into a single area and processing the corresponding area. An object map may be used to locate the object area in which the corresponding pixel is included. | |
| Video Object ID | A value assigned in order to determine an area of interest and to uniquely identify the corresponding area. The value assigned to each pixel within the object map indicates the object ID. | |
| Parameter Set ID | An identifier used for referring to value being applied to a group of parameters having a filter applied thereto. | For frequently used parameter values, instead of transmitting the parameter each time it is used, a method of transmitting the parameter once and loading the parameter value by using an ID for each parameter usage in a later process may be adopted. |
| Function Type | Represents the type of filter function being applied to each video object in a video Widget application | Contrast enhancement, unsharp masking |
| Parameters Value | Value used in each filter function | For Unsharp masking functions: threshold, radius, strength |
| Block based video Process | | |
| Macroblock/ Block Number | Macroblock: basic unit for video coding configured in a square shape of 16 × 16 pixels Block: unit dividing the Macroblock into configurations of 4 × 4, 8 × 8, 16 × 8, 8 × 4, etc. Macroblock/block number: a serial number used to identify each MB and block | |
| Parameter Set ID | Same as described above represents an identifier for parameters that are to be applied in block/macroblock units | |
| Function Type | Same as described above area of application corresponding to block units | |
| Parameter Value | Same as described above the parameters may be variably applied in block/macroblock units. | |
| Supported Filter Information | | |
| Sharpness | Enhance the sharpness of video or still image | |
| Blur | Defocus aberration, prescription of eyeglasses | |
| Contrast | In case of dark video or still pictures, adjust contrast value to indefinify the video or still image | |
| Smoothness | Smooth video or still picture | |
| Brightness | Reflect a given amount of light | |
| Gamma | Decode luminance or tristimulus values in video or still image | |
| Temperature | Color Temperature | |
| User Selection Information | | |
| Area Index | Index of a user selection area. The user can select multiple areas of a video area to apply the customized video filter. | The object map is used to perform area selection. (Area corresponding to the object ID to which the selected pixel belongs) |
| Selected Area | All information that indicate user selected video area. | Save as a user-created object map. |
| Widget Information | | |
| Unique ID (=Application | Unique Application Identification | 0x000001 or UUID |

TABLE 1-continued

| Widget Information | Description | Example |
|---|---|---|
| ID) | | |
| Author | Describes the author of this widget application | LG Electronics |
| Category | The type of widget application | Video, Audio, Image, etc. |
| Revision Number | Widget Application Version | 1.0.0 |
| Widget Rating | Executable Level or Policy | Over 19(+19), over 15(+15), etc. |
| Necessary Resources | | |
| Non-Volatile Memory | Necessary non-volatile memory to execute this widget application | 320 kb |
| Volatile Memory | Necessary volatile memory to execute this widget application | 1 MB |
| Server Information | | |
| Widget Application URIs | Widget application URI | http://www.lge.com/itf/widget/videowidget |
| Video Parameter URIs | The list of video filter URIs which receive the video parameters | http://www.lge.com/itf/widget/videoparameters/modelname |
| ITF Receiver Profile | | |
| Manufacturer OUI | Defines a Manufacturer Id | 00-E0-91(LG Electronics) |
| Model UID | ITF Manufacturer Unique ID | 12-34-54-EE |
| Model Name | ITF Manufacturer Model Name | 45US5DX |
| Video Resolution | Maximum display resolution on the ITF receiver | 1920 × 1080 p, 720 × 480 p, etc. |
| Graphic Resolution | Graphic resolution of ITF receiver to locate proper position and size of widget application | 192 × 1080, 960 × 540, etc. |
| Graphic Colors | Bit-depth of each pixel, when rendering graphic data to the OSD. | 32 bpp, 24 bpp, 16 bpp, 8 bpp |
| Video Frequency | Signifies a video frame rate | 60 Hz, 70 Hz, 75 Hz, 120 Hz, etc. |

The information defined in Table 1 corresponds to information required for operating the video widget application in the ITF. Herein, in addition to the video content, Table 1 is applicable to all contents having the format of a picture or image (or illustration), a text, and so on. Also, among the exemplary information given in Table 1, some of the information may be received from a service provider, such as a widget server, at the same time the video widget application is being downloaded, or some of the information may be separately downloaded. In this case, the corresponding information may be downloaded through the same channel or through different channels. Furthermore, some of the information may be set-up by the user. And, when the information is set-up by the user, the corresponding information is included in the user profile information, thereby being provided to a service provider including the widget server.

Referring to Table 1, the video widget information may include object-based process information, block-based process information, supported filter information, user selection information, widget information, necessary resources information, server information, and receiver profile information.

The Object-based process refers to a process of grouping interesting portions or portions having common characteristics within a video frame into a single area and processing the corresponding area. Herein, an object map may be used to locate the object area in which the corresponding pixel is included. The object-based process information may include a video object identifier (ID), a parameter set ID, a function type, and a parameter value. The video object ID defines an object ID of each pixel within the object map. The video object ID uniquely identifies each object of the area selected by the user within the frame. The parameter set ID corresponds to an identifier used for referring to a value being applied to a group of parameters having a video filter applied thereto. For example, in case of frequently used parameter values, instead of being transmitted each time, the corresponding parameter value may be used by being stored firsthand and then loaded by the parameter set ID when used in a later process. The function type defines the type of filter function being applied to each video object in a video widget application. For example, the function type may include contrast enhancement and unsharp masking. The parameter value defines a value used in each filter function according to the function type. For example, values of the unsharp masking type may include threshold, radius, and strength.

The block-based process refers to a process of grouping interesting portions or portions having common characteristics within a video frame into a single area and processing the corresponding area. Herein, an object map may be used to locate the block area in which the corresponding pixel is included. The block-based process information may include a macroblock/block number, a parameter set ID, a function type, and a parameter value. The macroblock/block number indicates a series of numbers used to identify each macroblock and block. Herein, for example, the macroblock refers to a basic unit for video coding configured in a square shape of 16 by 16 (16×16) pixels. And, the block refers to units dividing the macroblock into 4 by 4 (4×4), 8 by 8 (8×8), 16 by 8 (16×8), 8 by 4 (8×4) configurations. The parameter set ID refers to an identifier of the parameter that is to be applied in macroblock/block units. The definition of the parameter set ID is the same as that described in the object-based process information. The function type is also identical to that described in the object-based process information. However, the only difference is that the applied area corresponds to a block unit. The parameter value is also identical to that described in the object-based process information. However, the only difference is that the parameter may be varied depending upon the macroblock/block units.

The supported filter information provides information on applicable file parameters in the video custom filter. For example, the supported filter information may include Sharpness, Blur, Contrast, Smoothness, Brightness, Gamma, and Temperature. The Sharpness may enhance the sharpness of a video frame or still image. The Blur may process defocus aberration and eyeglasses prescription of the video frame or still image. The Contrast may, in case of a dark video or a still picture, adjust contrast value to indefinify the video frame or still image. The Smoothness smoothes the video frame or still image. The Brightness may reflect a given amount of light. The Gamma may decode luminance or tristimulus values in the video frame or still image. The Temperature may represent color temperature. The supported filter information may be linked with the parameter sets of the above-described object-based process and block-based process. Also, the supported filter information may be provided from a service provider including a widget server, or the user may change the settings of the provided supported filter information. For example, when the user changes the supported filter information, the changed information may be included in the user profile information, so as to be transmitted to the server.

The User selection information may include an area index and a selected area. The area index may correspond to an index of a user selection area. A user may select multiple areas of a video area to apply the customized video filter. For this, the IPTV receiver may use the object map to know (or be informed of) the area index of the selected area. More specifically, when a particular index is selected, the area corresponding to the object ID, to which the respective pixel belongs, becomes the area index. The Selected Area may correspond to information that indicates user selected video frame area. The Selected Area may be stored as a user-created object map.

The Widget information provides information on a video widget application that is being executed. Herein, the widget information may include a Unique ID (or Application ID) information, Author information, Category information, Revision Number information, and Widget Rating information. The Unique ID information may be defined as a unique application identifier. Herein, the Unique ID information may be given a value of '0x000001' or 'UUID'. The Author information may describe the author of the video widget application (e.g., LG Electronics). The Category information may define the type of the video widget application (e.g., video, audio, image, etc.). The Revision Number information may provide a version of the video widget application (e.g., version 1.0.0). The Widget Rating information may define an executable level or a policy (e.g., rated for over 19 (or rated +19), rated for over 15 (or rated +15), etc.).

The Necessary Resources information may include non-volatile memory information and volatile memory information. The non-volatile memory information may define a necessary non-volatile memory to execute the corresponding video widget application. The volatile memory information may define necessary volatile memory to execute the video widget application.

The Server information may include widget application URIs information and video parameter URIs information. The widget application URIs information may define one or more URIs to download widget applications (e.g., http://www.lge.com/itf/widget/videowidget). The video parameter URIS information may define a list of video filter URIs receiving the video parameters (e.g., http://www.lge.com/itf/widget/videoparameters/modelname).

The ITF receiver profile information may include manufacturer OUI information, model UID information, model name information, video resolution information, graphic resolution information, graphic colors information, and video frequency information. The manufacturer OUI information may define a manufacturer ID (e.g., 00-E0-91 (LG Electronics)). The model UID information may define an ITF manufacturer unique ID (e.g., 12-34-54-EE). The model name information may define an ITF manufacturer model name (e.g., 45US5DX). The video resolution information may define a maximum display resolution on the ITF receiver (e.g., 1920×1080p, 720×480p, etc.). The graphic resolution information may define a graphic resolution of the ITF receiver to locate a proper position and size of a widget application (e.g., 1920×1080, 960×540, etc.). The graphic colors information may define a bit-depth of each pixel when the graphic data is rendered in the OSD (e.g., 32 bpp, 24 bpp, 16 bpp, and 8 bpp). The video frequency information may define a rate of the video frame (e.g., 60 Hz, 70 Hz, 75 Hz, 120 Hz, etc.).

FIG. 23 to FIG. 26 illustrate diagrams showing exemplary video output data layers according to the present invention.

FIG. 23 to FIG. 26 illustrate diagrams describing the process of each video frame being processed in the ITF and being finally displayed to the user.

Figure 23:
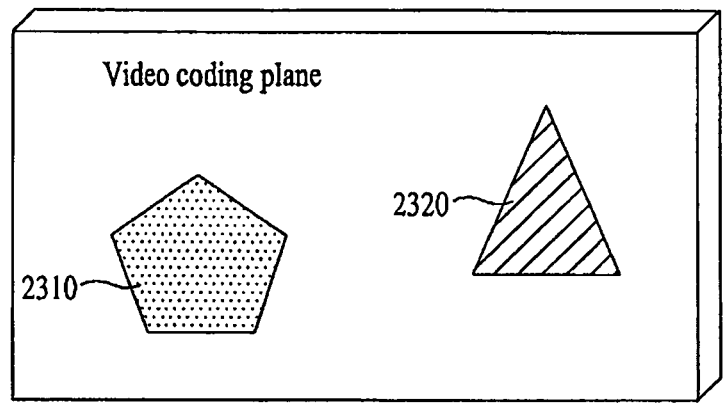
FIG. 23 to FIG. 26 illustrate diagrams showing exemplary video output data layers according to the present invention.

FIG. 23 illustrates a video coding plane. Herein, the video coding plane represents a video frame being coded and transmitted from the transmitting system. The video coding plane shows an object prior to being processed by the ITF.

Figure 24:
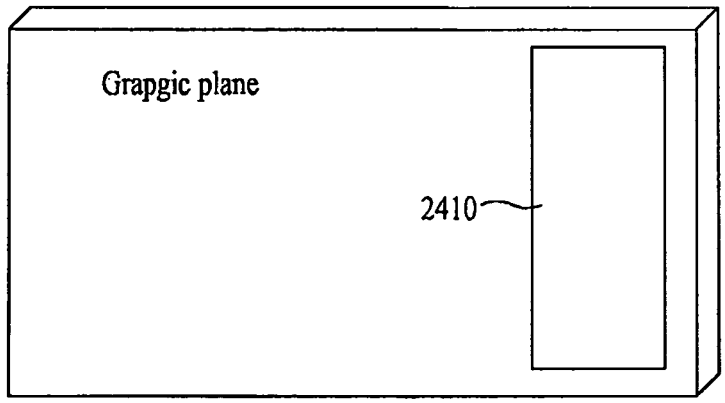

FIG. 24 illustrates a graphic plane. Herein, the graphic plane represents an OSD screen or OSD data for a particular function that is implemented in the ITF through the OSD in accordance with a user request.

Figure 25:
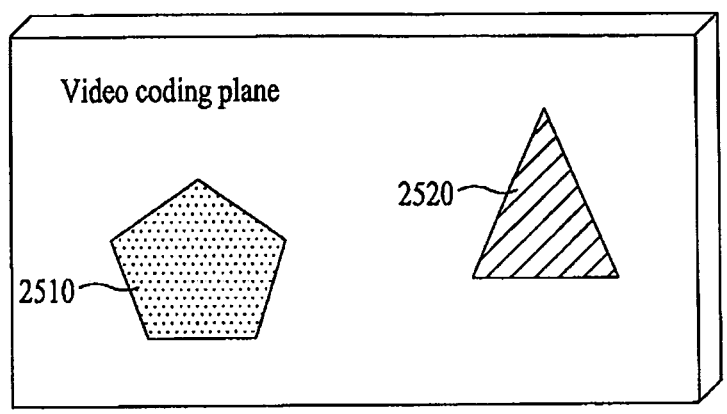

FIG. 25 illustrates a video display plane. More specifically, FIG. 25 shows an output format of each object included in the video frame shown in FIG. 23 being processed by the ITF.

Figure 26:
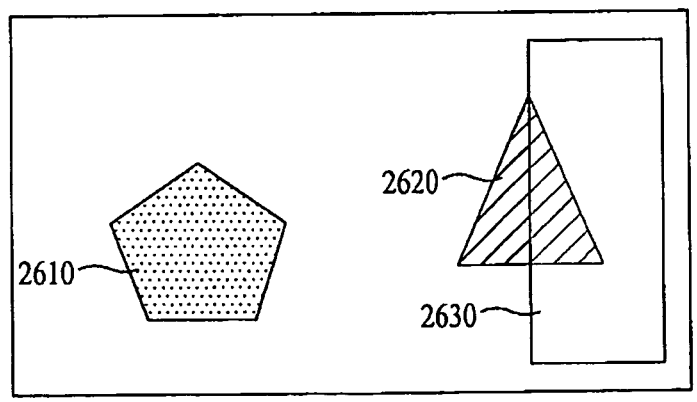

FIG. 26 illustrates a final display screen provided to the user. In other words, FIG. 24 and FIG. 25 are combined (or merge) so as to be finally displayed.

As described above, when the user selects a specific area or video object of the video frame, with respect to the selected specific area or video object, the ITF extracts the corresponding area or corresponding video object from the video display plane of FIG. 25. In other words, this indicates that the ITF uses pixel values and coordinates of the video display plane shown in FIG. 25.

Herein, the ITF may store the selected area or video object itself or the information related to the selected area or video object in the memory. In this case, the ITF may process the selected area or video object or the related information in the form of a still image.

Additionally, the ITF may apply the video custom filter set-up by the user to the still image stored in the memory. The ITF may also overwrite the applied results in the same area. Alternatively, the ITF may also store the applied results in other areas, so as to separately preserve the still image prior to having the video custom filter set-up by the user applied thereto, as a form of precaution in case of emergency situations.

FIG. 27 to FIG. 30 illustrate exemplary menu execution for selecting a specific area within the video frame and for performing a video custom filter according to an embodiment of the present invention.

For example, FIG. 27 to FIG. 30 describe the process of applying the video custom filter according to the present invention to the display screen being provided to the user, as shown in FIG. 26.

Figure 27:
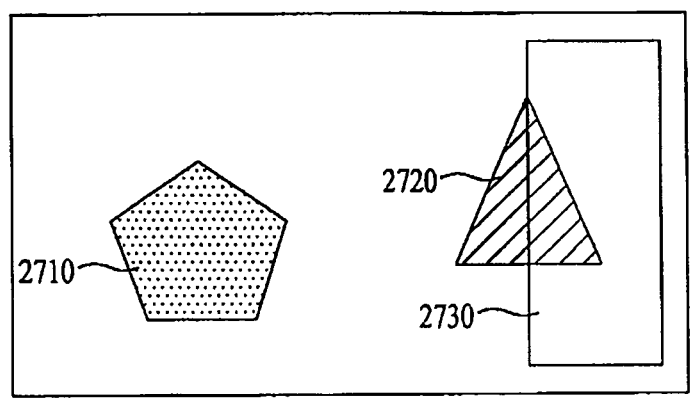
FIG. 27 to FIG. 30 illustrate exemplary menu execution for selecting a specific area within the video frame and for performing a video custom filter according to an embodiment of the present invention.

FIG. 27 illustrates an exemplary case where a video is paused so that the video filter can be applied thereto by the user in FIG. 26. In this case, the still image is displayed on the screen.

Figure 28:
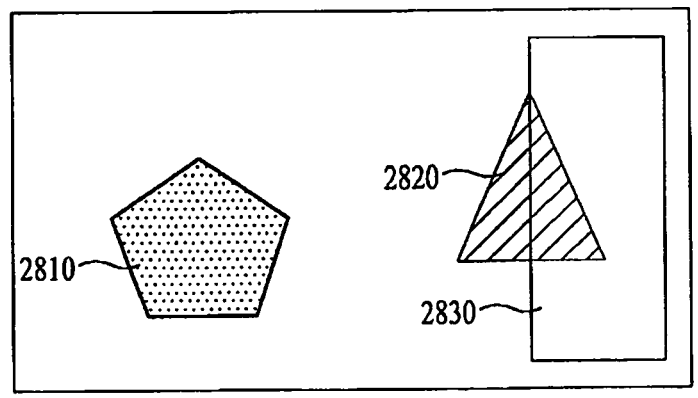
Figure 29:
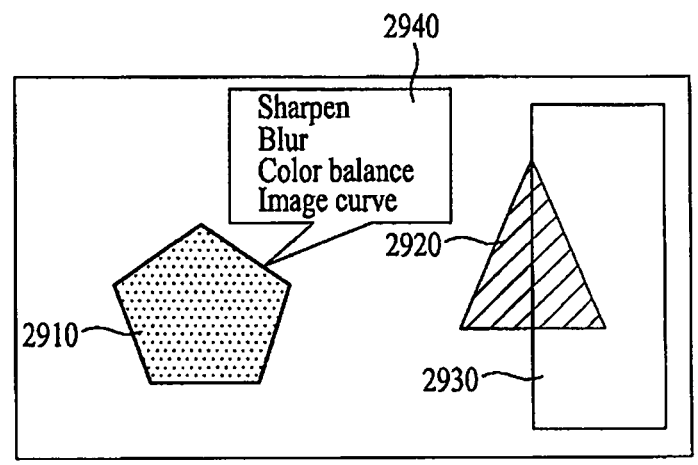
Figure 30:
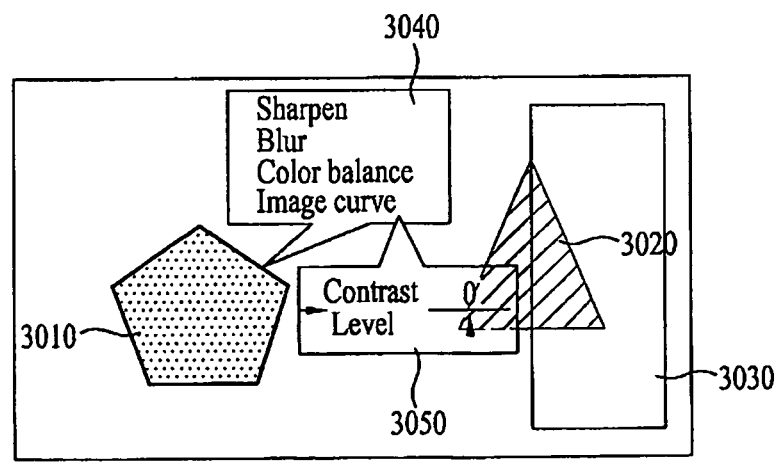

FIG. 28 illustrates a case where an area of interest is set-up by the user, as shown in FIG. 27. FIG. 29 and FIG. 30 illustrate exemplary cases where the video custom filter is applied by the user. More specifically, FIG. 29 shows an example where a specific area or specific video object is selected by the user in FIG. 28 as an area of interest. In this example, FIG. 29 shows a pop-up menu provided by the ITF. Also, when a specific function is selected in relation to the pop-up menu (primary menu) provided in FIG. 29, FIG. 30 shows an exemplary pop-up menu (secondary menu) provided for more detailed settings in relation to the selected specific function. The pop-menus provided in FIG. 29 and FIG. 30 may consist of exemplary functions that can be provided by the video custom filter. Herein, the functions may be equipped in the IPTV receiver or may correspond to TOOLS that can be downloaded from the service provider, such as the widget server. Herein, the TOOLS may allow the user to change the values of the parameters in order to apply the corresponding TOOL. More specifically, when a TOOL is downloaded, by changing the parameter, the user may apply the corresponding TOOL to a random area or object.

In order to apply the video filter, the video filter may include the TOOLS shown in Table 2 below.

TABLE 2

| Function Class | Image Tool Type | Parameters |
|---|---|---|
| Select | Select Area | |
| | Deselect Area | |
| | Inverse selection | |
| | Select All | |
| Area/Object Overlay | Set Transparency | Amount (%) |
| Sharpen | Unsharp Mask | Radius |
| | | Threshold |
| | | Amount |
| Blur | Gaussian Blur | Radius |
| Image curve | Contrast | Amount |
| | Level | Amount |
| Color balance | Red | Amount (%) |
| | Green | Amount (%) |
| | Blue | Amount (%) |
| Smoothing | Boundary | Radius |
| | Smoothing | Threshold |

Table 2 shows an exemplary list of TOOLS for the custom filter. However, this is merely exemplary, and, therefore, the present invention is not limited only to the TOOLS shown in Table 2. Other TOOLS may also be downloaded and applied to the area of interest selected by the user.

Referring to Table 2, FIG. 29, and FIG. 30, the FUNCTION CLASS may indicate a primary menu, and the IMAGE TOOL TYPE may indicate a secondary menu (or sub-menu). Furthermore, each IMAGE TOOL TYPE may be set-up by the above-described parameters.

Referring to Table 2, the function class may include a Select class, an Area/Object Overlay class, a Sharpen class, a Blur class, an Image curve class, a Color balance class, and a Smoothing class. Each class may include a type of an image tool. Also, each class may further include parameters.

The Select class may include a Select Area image tool, a Deselect Area image tool, an Inverse selection image tool, and a Select All image tool.

The Area/Object Overlay class may include a Set Transparency image tool and the respective parameter (e.g., Amount (%)).

The Sharpen class may include an Unsharp mask image tool and the respective parameters (e.g., Radius, Threshold and Amount).

The Blur class may include a Gaussian Blur image tool and the respective parameter (e.g., Radius).

The Image curve class may include a contrast image tool, a Level image tool, and the respective parameters (e.g., Amount).

The Color balance class may include a Red image tool, a Green image tool, a Blue image tool, and the respective parameters (e.g., Amount (%)).

The Smoothing class may include a Boundary image tool, a Smoothing image tool, and the respective parameters (e.g., Radius and Threshold).

TABLE 3

| Function | Method | Description |
|---|---|---|
| selectAll | OUID selectAll(void); | The overall area of the screen is selected. When selected, an Object Unique Identifier value is returned. This value may be used for selecting and modifying an area in a later process. |
| selectArea | OUID selectArea(CVector vt); | By using the function CVector, an area may be selected in polygonal or streamlined shapes (including circles). Then, when information of the selected area is inputted to the function, the area is selected, thereby returning an OUID value. |
| inverseSelect | OUID inverseSelect(OUID); OUID inverseSelect(CVector vt); | When the OUID value of the selected area is inputted, an inversed area of the selected area is selected, thereby returning a new OUID value. At this point, the existing OUID value may still be valid. Furthermore, when using a function such as CVector, the selected area may be directly inversed without using the selectArea function, thereby obtaining the OUID value. |
| deselectArea | Boolean deselectArea(OUID Ouid); Boolean deselectArea(OUID ouid, CVector vt); | The same parameters of the inverseSelect function are included in the deselectArea function, which deselected a designated area. When the OUID and CVector information are inputted, only the designated portion is deselected. |
| setTransparency | Boolean setTransparency(OUID ouid, Integer amount); | This function provides transparency. The 'Amount' signifies the value, and the effect increases as the value becomes coarser. |
| setEdge | Boolean setEdge(OUID ouid, Integer horizontal, Integer vertical, Integer threshold); | This function provides an edge effect to the selected area. Once an area is designated, the edge may be applied to all elements including objects and people. Herein, the edge effect is not applied when the color value of the respective pixel is below or equal to the threshold value, and applied only when the color value of the pixel is |

TABLE 3-continued

| Function | Method | Description |
|---|---|---|
| | | greater than the threshold value. When applying the edge effect, a radius value may be designated. |
| setGaussianBlur | Boolean setGaussianBlur(OUID ouid, Integer horizontal, Integer vertical); | This function provides a blur effect to the selected area. By inputting direction values (horizontal and vertical) to this function, the user may decide the direction to which the blur effect can become stronger. For example, if the horizontal value is '0', the blur effect occurs in the vertical direction. |
| setColorBalance | Boolean setColorBalance(OUID ouid, CPalette pal); Boolean setColorBalance(OUID ouid, Integer red, Integer green, Integer blue); | The user may set-up a Color Balance value in the overall or designated area. For example, when a palette having no red color value is set-up and applied to the designated area, a screen having no red tone will be displayed to the user. |
| setImageCurveConstrast | Boolean setImageCurveConstrast(OUID ouid, Integer amount); | By setting the amount value, the Contrast value may be set-up. |
| setImageCurveLevel | Boolean setImageCurveLevel(OUID ouid, Integer amount); | The level of a specific color within the overall image or a designated portion of the image may be adjusted. For example, when a specific area is selected, the colors of the selected area are extracted so as to create a curve graph. Herein, amount values may be set-up so that the level of a specific portion within the curve graph can be changed. |
| setSharpen | Boolean setSharpen(OUID ouid, Integer horizontal, Integer vertical, Integer threshold, Integer amount); | The sharpness of the overall image or of a designated portion of the image may be adjusted. |

Herein, the OUID refers to an Object Unique Identifier that is returned when a specific area is selected by using functions such as CVector. When the OUID is included, the selected area may be selected or cancelled. CRect may be used to designate rectangular areas (i.e., squares or rectangles), and CVector may be used to designate other polygonal areas. CPalette may store color values, such as YUV and RGB, so as to be used in the functions described herein.

Referring to Table 3, the Function may include a selectAll function, a selectArea function, an inverseSelect function, a deselectArea function, a setTransparency function, a setEdge function, a setGaussianBlur function, a setColorBalance function, a setImageCurveConstrast function, a setImage-CurveLevel function, and a setSharpen function. Herein, Table 3 may include methods and descriptions related to each function.

The selectAll is a function that selects a whole (or overall) area of a screen. The selectAll is used to the OUID selectAll (void) method. Also, the selectAll function may return an object Unique ID according to the OUID selectAll (void) method. This value may be used for selecting or modifying areas in a later process.

The selectArea is a function that enables areas to be selected in polygonal or streamlined shapes (including circles). Then, when information of the selected area is inputted to the function, the area is selected, thereby returning an OUID value. The selectArea uses an OUID SelectArea (CVector vt) function. By using the CVector function, when information of the selected area is included in the SelectArea (CVector vt) function, the corresponding area is selected, thereby retuning the OUID value.

The inverseSelect function uses an OUID inverseSelect (OUID) function and/or an OUID inverseSelect(CVector vt) function. When the OUID value of the selected area is inputted through the OUID inverseSelect(OUID) function and/or the OUID inverseSelect(CVector vt) function, an inversed area of the selected area is selected, thereby returning a new OUID value. At this point, the existing OUID value may still be valid. Also, by using the CVector function, the selected area may be directly inverted so as to obtain the OUID value without using the selectArea function.

The deselectArea function uses a Boolean deselectArea (OUID ouid) function and/or a Boolean deselectArea(OUID ouid, CVector vt) function. This function includes the same parameters as the inverseSelect function and deselects the designated area. More specifically, by inputting OUID and CVector information in the above-mentioned functions, the deselectArea function may deselect only a designated portion of the screen.

The setTransparency function uses a Boolean setTransparency(OUID ouid,Integer amount) function to provide a transparency effect. In the Boolean setTransparency(OUID ouid, Integer amount) function, 'amount' represents the value. Herein, the transparency effect grows stronger, as the value becomes coarser.

The setEdge function uses a Boolean setEdge(OUID ouid, Integer horizontal, Integer vertical, Integer threshold) function, so as to provide an edge to the selected area. In the Boolean setEdge(OUID ouid, Integer horizontal, Integer vertical, Integer threshold) function, once an area is designated, the edge may be applied to all elements including objects and people. Herein, the edge effect is not applied when the color value of the respective pixel is below or equal to the threshold value, and applied only when the color value of the pixel is greater than the threshold value. When applying the edge effect, a radius value may be designated.

The setGaussianBlur function uses a Boolean setGaussianBlur(OUID ouid, Integer horizontal, Integer vertical) function, so as to provide a blur effect. By using the Boolean setEdge(OUID ouid, Integer horizontal, Integer vertical, Integer threshold) function, direction values (horizontal and vertical) may be inputted, so that the user can decide to which direction the blur effect should become stronger. For example, if the horizontal value is '0', the blur effect occurs in the vertical direction.

The setColorBalance function uses a Boolean setColorBalance(OUID ouid, CPalette pal) function and/or a Boolean setColorBalance(OUID ouid, Integer red, Integer green, Integer blue) function, a Color Balance value may be set-up in the whole (or overall) or designated area. For example, when a palette having no red color value is set-up and applied to the designated area, a screen having no red tone will be displayed to the user.

The setImageCurveConstrast function uses a Boolean setImageCurveConstrast(OUID ouid, Integer amount) function to determine an amount value, thereby determining a Contrast value.

The setImageCurveLevel function uses a Boolean setImageCurveLevel(OUID ouid, Integer amount) function, so as to adjust the level of a specific color within the overall image or a designated portion of the image. For example, when a specific area is selected, the colors of the selected area are extracted so as to create a curve graph. Herein, amount values may be set-up so that the level of a specific portion within the curve graph can be changed.

The setSharpen function uses a Boolean setSharpen(OUID ouid, Integer horizontal, Integer vertical, Integer threshold, Integer amount) function, so as to adjust the sharpness of the whole (or overall) image or a designated portion of the image.

However, this is merely exemplary, and, therefore, the present invention will not be limited only to the function formats given in Table 3. For example, the function formats may also be defined in other formats, such as JavaScript API.

FIG. 31 to FIG. 34 illustrate conceptual diagrams showing the performance of the video custom filter and its influence on each video layer according to the present invention.

FIG. 31 to FIG. 34 illustrate diagrams for describing the effect (or influence) of the video custom filter applied in FIG. 29 to FIG. 30.

Figure 31:
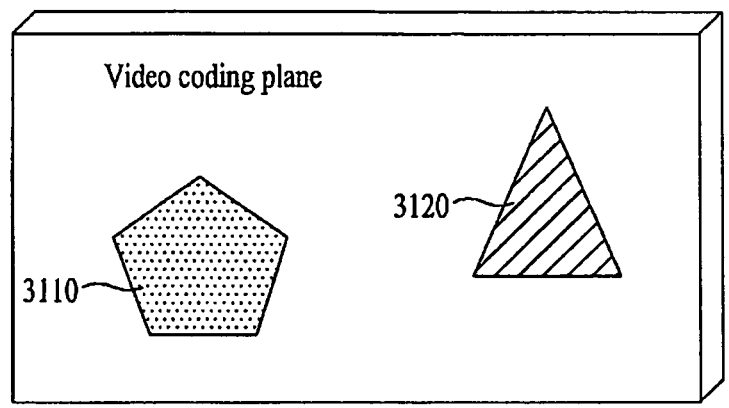
FIG. 31 to FIG. 34 illustrate conceptual diagrams showing the performance of the video custom filter and its influence on each video layer according to the present invention.
Figure 32:
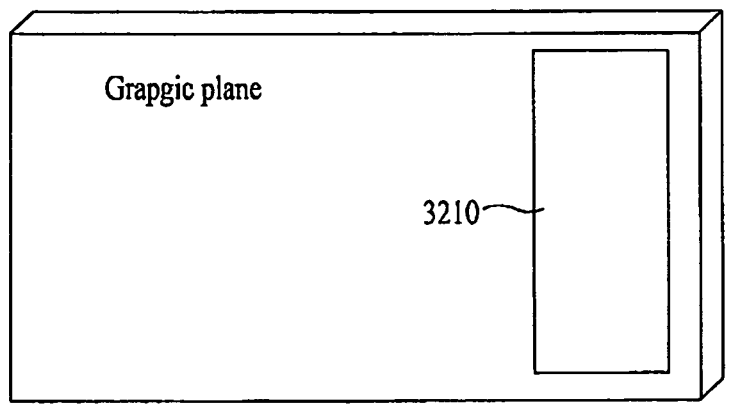
Figure 33:
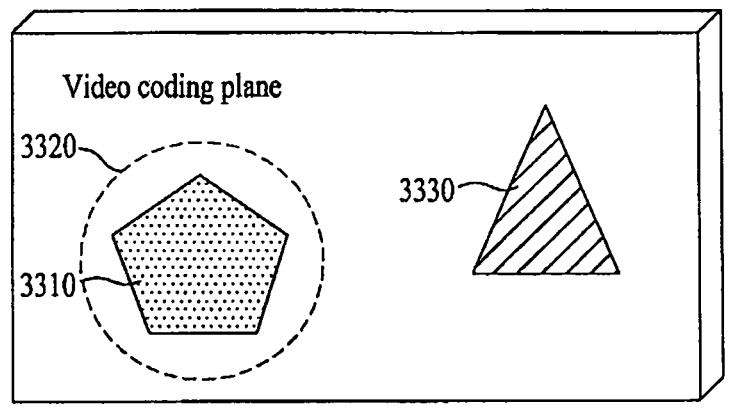
Figure 34:
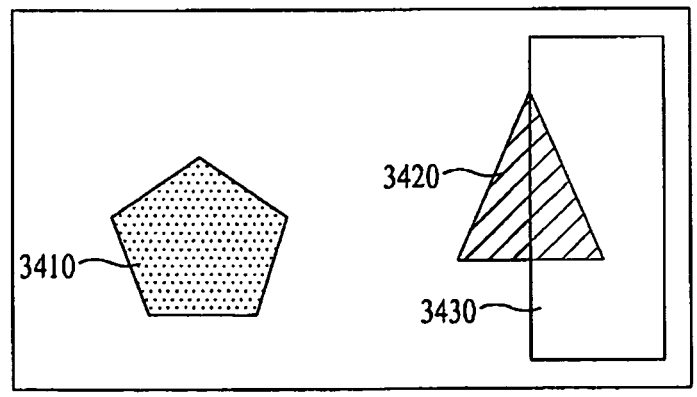

The detailed description of FIG. 31 and FIG. 32 are the same the above description. FIG. 33 shows an enhanced image of the selected object depending upon the applied result of the video custom filter in FIG. 29 to FIG. 30. And, FIG. 34 shows that a display screen including the finally enhanced image is outputted along with the OSD data.

However, in the above-description, when the user applies a video custom filter to a specific area of the video from the user equipment (or terminal), the applied video custom filter only influences the display screen being provided to the user and may not influence the actual bit-stream. Furthermore, when the video frame is being outputted, each parameter, i.e., each custom filter set-up value applied to all or some objects by the user may be temporarily applied and then initialized.

Figure 35:
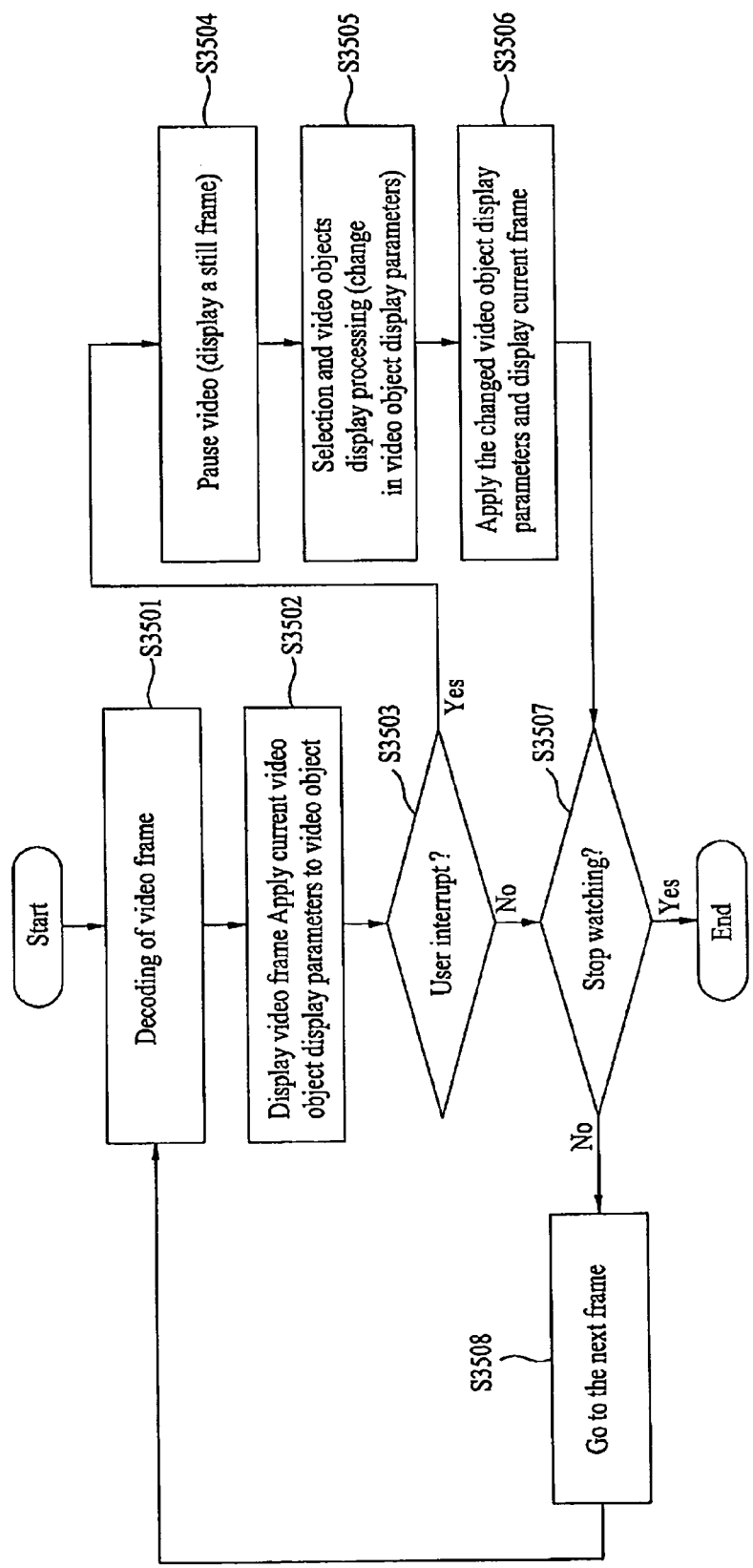
FIG. 35 illustrates a flow chart showing the process steps of a method of applying a video filter to a selected area within a video frame according to the present invention.

FIG. 35 illustrates a flow chart showing the process steps of a method of applying a video filter to a selected area within a video frame according to the present invention.

Basically, FIG. 35 illustrates a case where a video content having predetermined video parameters applied thereto is paused (or temporarily stopped) during the viewing of the video content and where an area of interest is selected from the paused screen, thereby applying a video filter including the user-selected video parameter with respect to the selected area. During the process of viewing (or watching) the video content, when the video filter settings are changed, the playback (or reproducing) of the corresponding video content is paused (or temporarily stopped). In order to perform such operation, the ITF should include a time-shift function in case the video content corresponds to a recorded program, a PVR-function-embedded program, or a real-time program.

The ITF decodes a video frame (S3501) and displays the decoded video frame (S3502). Herein, one or more video objects exist in the displayed video frame. Also, predetermined display parameters are applied to the video objects. At this point, for example, the video frame may correspond to any one of an I-frame, a B-frame, and a P-frame.

The ITF determined whether an interruption has occurred by the user (S3503). Herein, an example of the interruption made by the user may correspond to a video widget application request made by an input means for applying a video filter to the corresponding video frame or to one or more objects within the corresponding video frame.

As a result of step 3503, when an interruption made by the user occurs, the playback of the corresponding video content is stopped (S3504). In this case, the ITF will display a still picture on frame (S3505).

Subsequently, the ITF receives a selected area from the user and also receives a selection of video parameters that are to be applied to the selected area (S3505).

The ITF applied the selection of video parameters to the selected area (S3506).

Thereafter, the ITF determines whether a request for discontinuing viewing of the corresponding video frame has been made (S3507).

Depending upon the result of step 3507, if a request for discontinuing viewing of the corresponding video frame has not been made, the ITF continues to the next video frame (S3508). Hereinafter, the above-described process is repeated on the next video frame.

The above-described method may only be applied to the video frame itself or only to a selected area of the corresponding frame. Hereinafter, an example of applying a video filter using a video widget application on a selected area within a specific frame among a plurality of frame configuring a single video content will be given in the following description, in order to facilitate and simplify the understanding of the present invention. However, the present invention will not be limited to the example presented herein. As described above, it is apparent that the video filter may be applied in other cases.

FIG. 36 to FIG. 40 respectively illustrate examples of applying a video filter by using a video widget application in the ITF according to the present invention.

The ITF decodes each video frame and provides the decoded video frames to the user through a display screen. During this process, the ITF verifies (or determines) whether or not an interruption occurs by the user. Based upon the verified result, if it is determined that an interruption has been made by the user, the ITF stops the playback of the video content.

When a specific area is selected by the user, the ITF extracts information on the corresponding specific area. Herein, examples of the information on the specific area includes position information on the specific area, information of the block (or macroblock) matching with the specific area, and information on each object included in the specific area. After processing the corresponding information with video frame decoding, the ITF separately stores the processed information in the memory. Then, depending upon the user's selection, the ITF extracts information associated to the corresponding video frame. For example, the information on each object may include an ID of the corresponding object, the name of the corresponding object, brand name, product name, and link information, such as a URI providing the video-frame-associated information.

Subsequently, the ITF receives settings for the video filter functions from the user through the video widget application with respect to the corresponding specific area.

Then, the ITF applies the received video filter functions to the specific area, thereby displaying the specific area having the video filter applied thereto.

Figure 36:
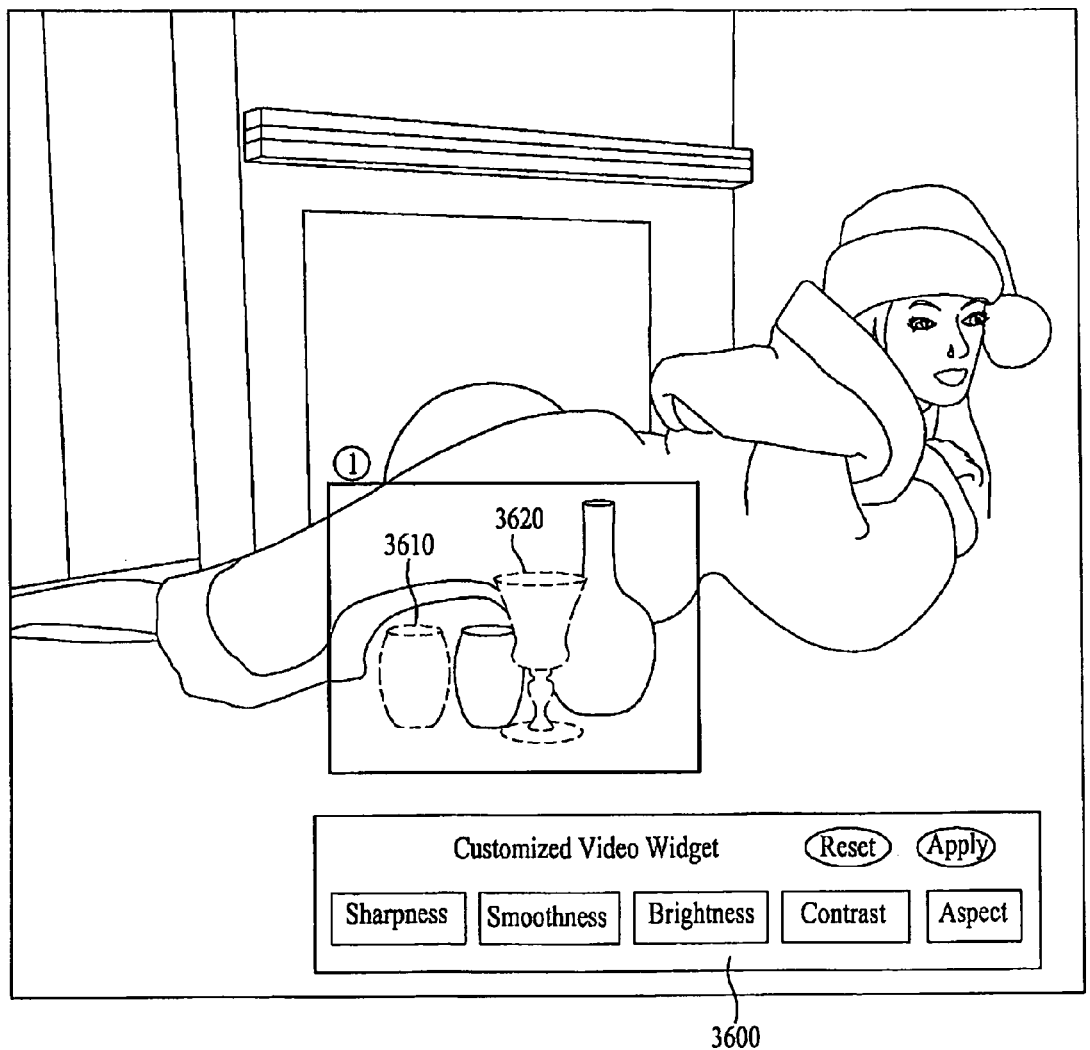
FIG. 36 to FIG. 40 respectively illustrate examples of applying a video filter by using a video Widget application in the ITF according to the present invention.

Referring to FIG. 36, one video frame is displayed on a display screen 3600. And, a video widget application 3610 is being executed at the lower portion of the display screen. Also, a specific area (①) selected by the user exists at the central portion of the video frame being displayed. Herein, the specific area (①) may be selected by using an indicating or input means (hereinafter referred to as "indicating means"), such as a cursor, a pointer, and a mouse. Also, when the video widget application 3610 is being executed, the indicating means may appear on the screen. Conversely, when the specific area is selected by the indicating means, the video widget application 3610 for applying the video filter to the selected area may be executed.

As shown in FIG. 36, 4 objects may exist in the specific area (①). And, among the 4 objects, 2 objects 3620 and 3630 are selected by the user. Herein, the selected objects are marked in a dotted line. At this point, when the indicating means is located on an object, the corresponding object may be marked in a dotted line so as to induce selection of the user.

Figure 37:
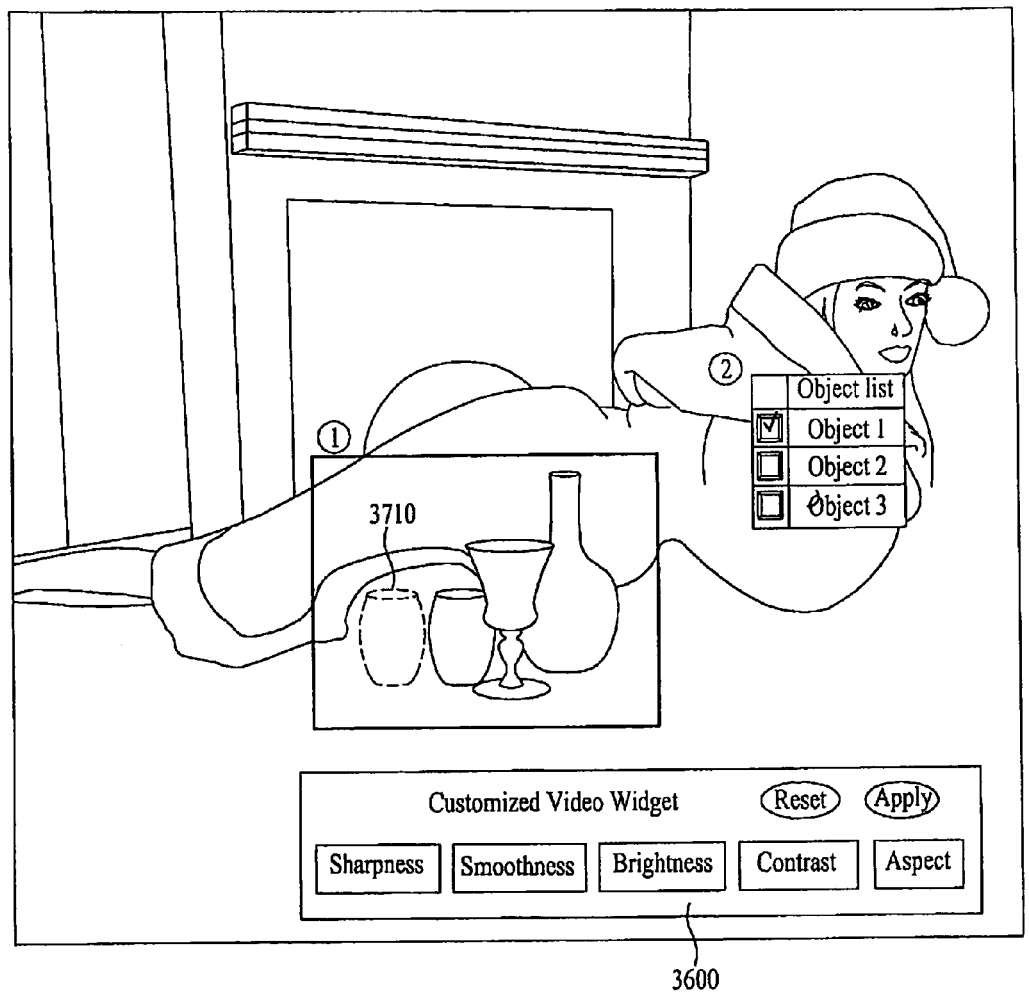

Referring to FIG. 37, when a specific area is selected by the user, a list of objects included in the corresponding specific area is provided through the OSD. In relation to the corresponding video frame, the ITF extracts information on each object from the memory, so as to configure and provide an UI (②), as shown in FIG. 37. Herein, when a specific object is selected by the user from the provided object list UI (②), the ITF may perform control operations by being linked to the UI (②), so that the corresponding object can be marked in a dotted line on the display screen.

Figure 38:
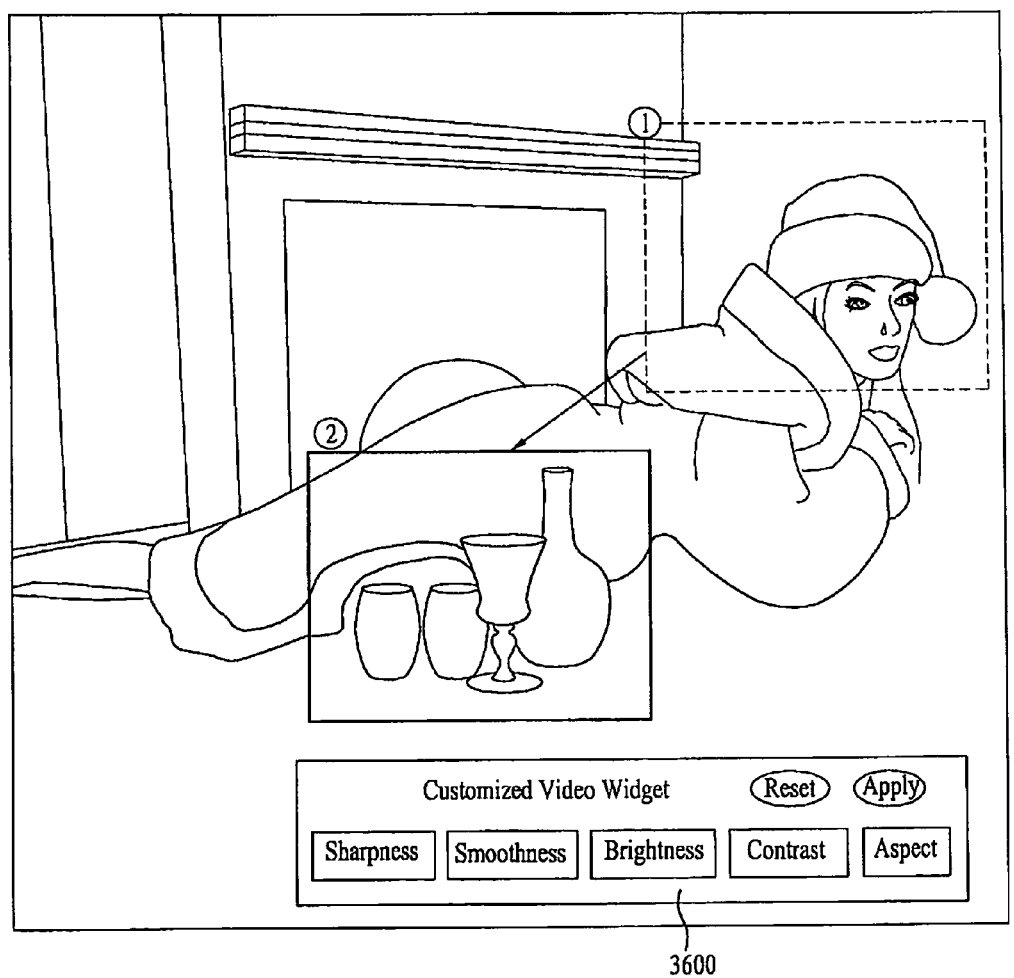

FIG. 38 illustrates a case where the video filter is applied within the corresponding video frame by shift from the first area (①) to the second area (②). More specifically, after performing the process steps shown in FIG. 36 to FIG. 37 on the first area (①), when another area, i.e., the second area (②), is selected within the corresponding video frame, the ITF extracts information on the objects associated to the selected second area (②) once again from the memory. Thereafter, the ITF uses the extracted information to perform the processes shown in FIG. 36 to FIG. 37.

Figure 39:
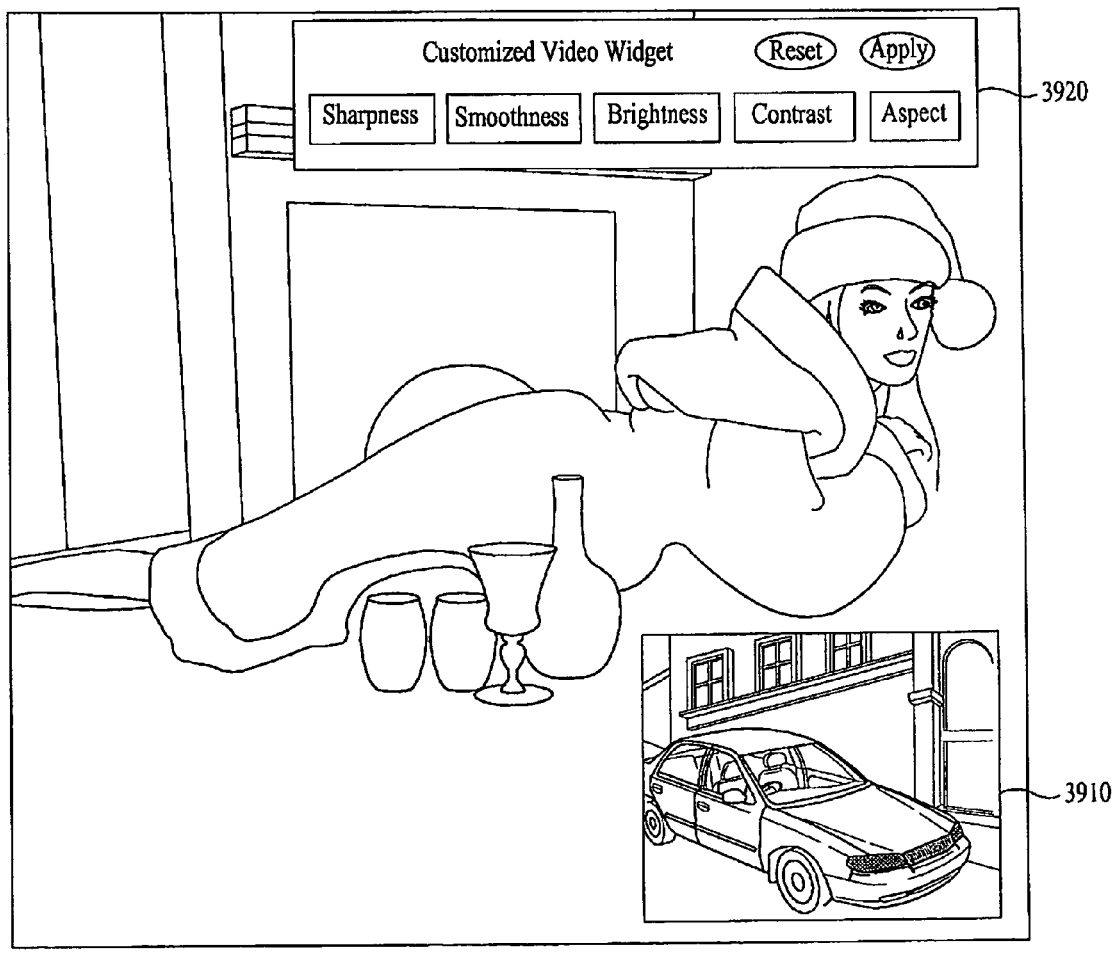

Referring to FIG. 39, in case the ITF provides a PIP function or a POP function, the ITF may also operate a video widget application for applying a video filter in the corresponding PIP video frame or POP video frame. Herein, either the ITF may be separately provided with a PIP-specific video widget application or a POP-specific video widget application, or the ITF may directly use the already-existing video widget application without any modification. Furthermore, for the video filter function of the PIP-specific or POP-specific video widget application, the ITF may provide the same function as that of the main-screen-specific video widget application, or may provide a different function.

Figure 40:
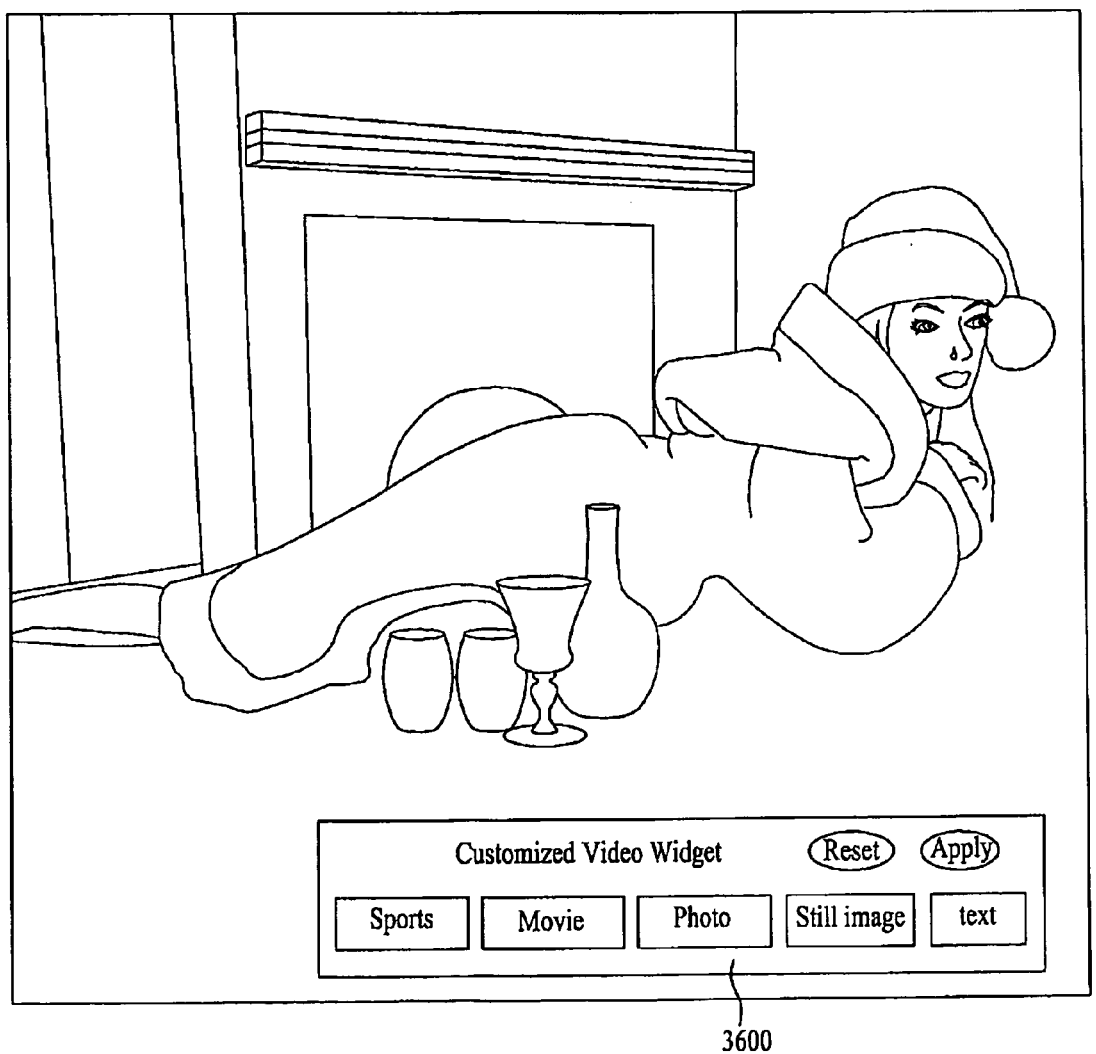

Functions of the video filter provided by the video widget application shown in FIG. 36 to FIG. 39 may include Sharpness, Smoothness, Brightness, Contrast, and Aspect. However, this is merely exemplary. As shown in FIG. 40, there may exist a video widget application that provides a video filter having functions decided based upon the genre (or category).

In case of FIG. 40, among the functions of the video filter that are provided through the video widget application based upon the genre, a specific custom function is provided. Herein, although the specific area to which the video filter is to be applied is not shown in FIG. 40, when a specific area is selected by the user, as described above, the ITF may provide a custom function depending upon the genre for the corresponding area. However, the custom function based upon the genre shown in FIG. 40 may be more effective when applied to the corresponding video frame or to the corresponding video content itself.

According to the present invention, the ITF may download and store a video widget application including a video filter that provides specific functions in accordance with the user's separate request, or the ITF may download and store only video parameters associated to the functions of the video filter. More specifically, multiple video widget applications or multiple video filters provided by a video widget application may exist in the ITF. Therefore, when a request for a video widget application is received from the user, the ITF extracts information associated to the video widget application from the memory and may also provide the associated UI (e.g., a video Widget application list may be included, or a list video filter types available from each video Widget application may be provided). Accordingly, depending upon such user selection, the ITF may provide the corresponding video Widget application. If there is no user selection, the ITF may provide a video widget application predetermined by default in accordance with the user's request.

Additionally, in the above-described examples, when a specific area is selected by the user, the ITF extracts information on the corresponding area from the memory. At this point, if the extracted information includes supplemental information, the ITF provides a UI on the corresponding supplemental information at the same time the user request or user selection is made. The supplemental information may be directly provided through the OSD or may provide link information for an address including more detailed information. Such supplemental information may include a product name for the object, a brand name, price, purchasing site, and related news.

The ITF may be set to apply the video filter only to the corresponding video frame through the above-described video Widget application, or the ITF may be set so that the video filter settings for the corresponding content or all video contents can be applied. Furthermore, as shown in FIG. 38 to FIG. 39, different functions may be selected and applied for each portion within the display screen.

Hereinafter, an exemplary ITF operating the video Widget application will be described in detail.

Figure 41:
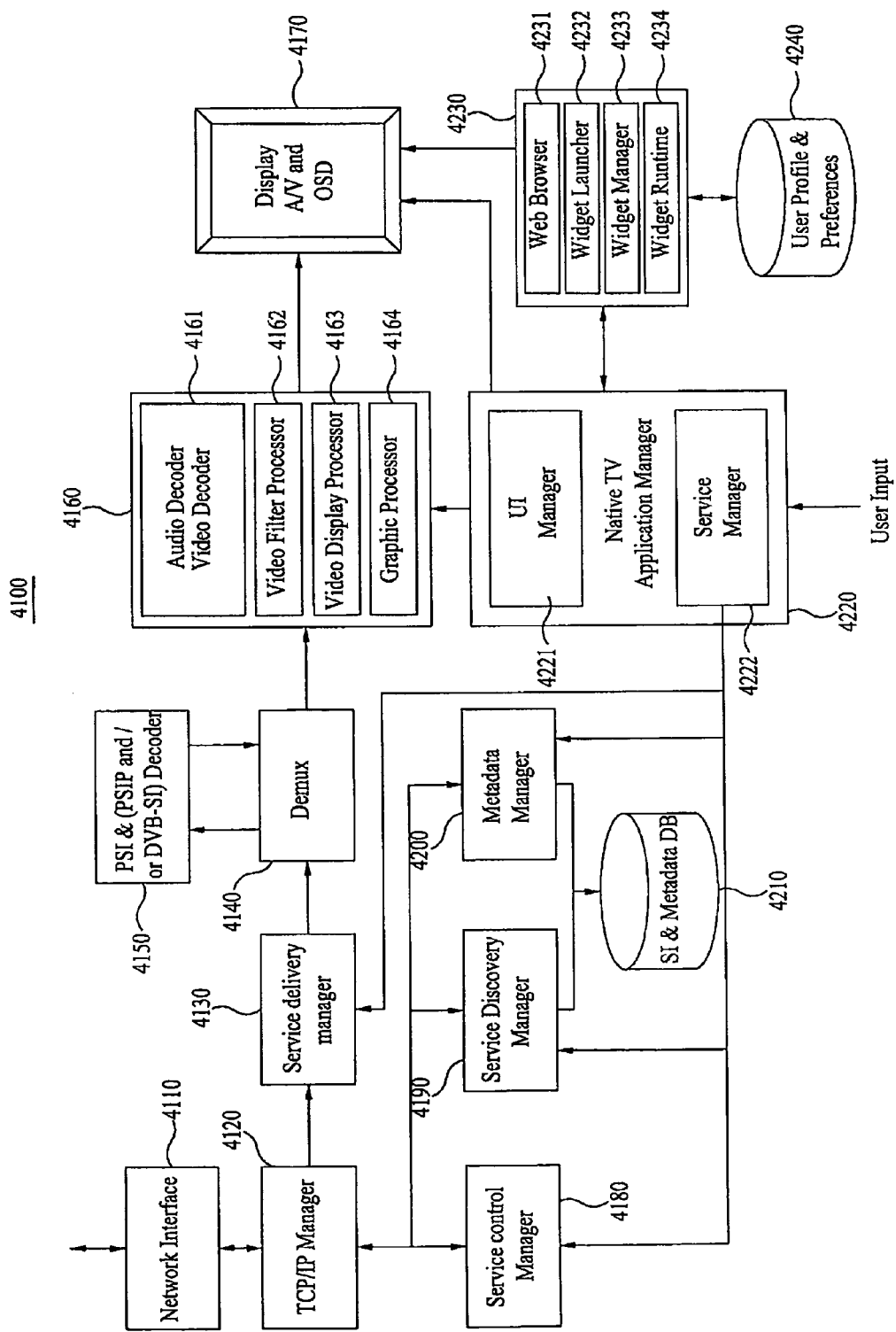
FIG. 41 is an exemplary block diagram of the ITF according to the present invention.

FIG. 41 is an exemplary block diagram of the ITF according to the present invention.

Referring to FIG. 41, the ITF 4100 comprises a network interface 4110, a TCP/IP Manager 4120, a service delivery manager 4130, a Demultiplexer (DEMUX) 4140, a signaling information decoder 4150, an A/V processor 4160, a display unit 4170, a service control manager 4180, a service discovery manager 4190, a metadata manager 4200, an SI & metadata DB 4210, an application manager 4220, a Widget processor 4230, and a user profile & preferences storage 4240.

The network interface 4110 receives and sends IPTV packets. The network interface 4110 connects a network via physical and data link layers.

The TCP/IP manager (or Internet protocol manager) 4120 is responsible for an end-to-end (source-to-destination) packet delivery. The TCP/IP manager 4120 classifies each packet into an appropriate protocol manager.

The service delivery manager 4130 is responsible for handling real-time streaming data and downloading contents. Also, the service delivery manager 4130 is responsible for retrieving contents from a content DB for later consuming (or usage). In this case, a Real-Time Transport Protocol/RTP Control Protocol (RTP/RTCP) may be used with an MPEG-2 TS. MPEG-2 packets are encapsulated in the RTP. The service delivery manager 4130 parses the RTP packets and sends the parsed transport packets to the DEMUX 4140. The service delivery manager 4130 sends a feedback on the network reception quality using the RTCP. The MPEG-2 transport packets may be carried directly in the UDP without the RTP. For content downloading, an HTTP or FLUTE protocol may be used as the delivery protocol.

The DEMUX 4140 demultiplexes audio, video, and Program Specific Information/Program and System Information Protocol (PSI/PSIP) tables from inputted transport packets. In this case, the demultiplexing of the DEMUX 4140 is controlled for PSI/PSIP tables by the signaling information decoder 4150. At this time, the DEMUX 4140 creates the sections of PSI/PSIP tables and sends them to the signaling information decoder 4150. Also, the demultiplexing of the DEMUX 4140 is controlled for A/V transport packets by the A/V processor 4160.

The signaling information decoder 4150 sets Packet Identifier (PID)s for the signaling information (i.e., PSI/PSIP and Digital Video Broadcasting-System Information (DVB-SI) tables) to the DEMUX 4140. The signaling information decoder 4150 decodes the private sections of the PSI/PSIP and/or DVB-SI sent by the DEMUX 4140. The decoding result is used to demultiplex inputted transport packets (e.g., set Audio and Video PID to the DEMUX 4140).

The A/V processor 4160 may include an A/V decoder 4161, a video filter processor 4162, a video display processor 4163, and a graphic processor 4164. The A/V decoder 4161 decodes audio and video (A/V) elementary stream packets. The video filter processor 4162 will process the video filter in all user-selected areas or a whole (or entire) video screen. The video filter processor 4162 may access the video frame buffer memory (not shown) to manipulate or adjust the video or still picture. The video display processor 4163 controls the picture-in-picture (PIP) video and/or the picture-on-picture (POP) video on the display screen. The video display processor 4163 also includes a video scale in the end of MPEG-2 decoder system. The graphic processor 4164 controls the OSD plane on the screen to display a UI menu and notification dialogue messages.

The display unit 4170 receives audio and video data from the A/V Decoder 4161. The display unit 4170 controls video and audio data and displays the data on the screen and through the speaker. The display unit 4170 also controls on-screen display (OSD) graphic data.

The Application Manager 4220 may support the graphic user interface (GUI) on the TV screen. The application manager 4220 may receive a user key by a remote controller or a front panel. And, the application manager 4220 may manage the states of the entire TV system.

The service manager 4222 may control all of the other managers related to the services, such as the service control manager 4180, the service delivery manager 4130, an IG-OITF client (not shown), the service discovery manager 4190, and the metadata manager 4200. The service manager 4222 may be responsible for serving IPTV services.

The SI & metadata DB 4210 is a database for service discovery information and metadata related to the services.

The service discovery (SD) manager 4200 may enable the discovery of IPTV services over a bi-directional IP network and may provide all information for selecting the corresponding service.

The service control manager 4180 may be responsible for selecting and controlling services and managing sessions. The service control manager 4180 may select a live broadcasting service, using the Internet Group Management Protocol (IGMP) or Real Time Streaming Protocol (RTSP) protocol. Also, the service control manager 4180 may select VOD contents, using the RTSP protocol. When using the International Measurement System (IMS), a Session Initiation Protocol (SIP) protocol may be used for initiating and managing sessions through the IMS gateway. The RTSP protocol may be used in the controlling of the delivery of broadcast TV and audio as well as for an on-demand delivery. The RTSP protocol may use a persistent TCP connection and allow a trick mode control on real-time media streaming.

The user profile & preferences storage 4240 may keep the user information, all information associated to the widget (installed widget and active/inactive widgets), preferences, and the ITF receiver's hardware compatibility and standard profile. The user profile data may be read from a Widget launcher 4232, a Widget manager 4233, and a web browser 4231, when the user logs into the system or deletes downloaded widget applications.

The Widget processor 4230 may include the web browser 4231, the Widget launcher 4232, the Widget manager 4233, and the Widget runtime 4234. The Widget launcher 4232 may execute an installed widget application when the user logs in. And, the Widget launcher 4232 may execute an activated widget application when the user changes the downloaded widget application. The Widget manager 4233 may display all widget applications that can be installed and executed in the ITF. And, the Widget manager 4233 may request downloading of a widget application that the user selected from the servers. Also, the Widget manager 4233 may activate/inactivate the downloaded Widget. The Widget manager 4233 may delete the downloaded or running widget application (or widget application being played). The Widget manager 4233 may control the running widget application and change the location of the widget application within the display screen. The Widget runtime 4234 may be used for a widget application that calls the predefined module or controls the interface in the ITF. The web browser (declarative application environment) 4231 may render HTML pages on the screen and parse documents according to a W3C specification.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing a content in an internet protocol television (IPTV) receiver, the method comprising:
transmitting a receiver profile to a server;

receiving an IP packet including the content from the server;
decoding the content from the received IP packet;
reproducing the content;
downloading a widget application from the server in accordance with the transmitted receiver profile while the content is reproduced, the widget application including one or more filters;
receiving a first interrupt signal;
pausing reproduction of the content in response to the first interrupt signal;
outputting an overlay window for the downloaded widget application in response to the received first interrupt signal;
receiving a second interrupt signal for selecting a video frame in accordance with the paused content or an area within the video frame of the paused content;
applying a filter selected from the one or more filters in the outputted widget application to the content;
generating and storing a user profile including information on the content and the filter applied to the content through the widget application; and
processing the reproduced content to which the filter is applied,
wherein the widget application is received with or based on at least one of a broadcast content guide (BCG) and service and discovery and selection (SD&S) information from the server.

2. The method of claim 1,
wherein the area with the video frame includes at least one object or block/macro-block.

3. The method of claim 2, wherein the at least one object or block/macro-block included in the selected area has an effect according to the applied filter.

4. The method of claim 2, further comprising:
outputting additional information associated to the at least one selected object or block/macro-block.

5. The method of claim 4, wherein the additional information comprises at least one of a name of an object or block/macro-block, a name of a person, a manufacturing brand name, and link information on an address including detailed information on the corresponding object or block/macro-block.

6. The method of claim 2, wherein the widget application provides a menu including a list of applicable filters.

7. The method of claim 6, wherein the menu comprises filter criteria associated to a picture quality, and wherein the filter criteria including at least one of SHARPNESS, SMOOTHNESS, BRIGHTNESS, CONTRAST, and ASPECT.

8. An internet protocol television (IPTV) receiver for processing a content, the IPTV receiver comprising:
a network interface unit for receiving an internet protocol (IP) packet including the content from a server;
a decoder for decoding the content from the received IP packet;
a user interface unit for receiving first and second interrupt signals;
a controller for controlling to transmit a receiver profile to the server, to reproduce the content, to download a widget application from the server while the content is reproduced, the widget application including one or more filters, to pause reproduction of the content in response to the first interrupt signal, to output an overlay window for the downloaded widget application in response to the first interrupt signal, to apply a filter selected from the one or more filters in the outputted widget application to the content, to generate and store a user profile including information on the content and the filter applied to the content through the widget application, and to process the reproduced content to which the filter is applied; and
a display unit,
a second interrupt signal for selecting a video frame in accordance with the paused content or an area within the video frame of the paused content, and
wherein the widget application is received with or based on at least one of a broadcast content guide (BCG) and service and discovery and selection (SD&S) information from the server.

* * * * *